United States Patent
Kobayashi et al.

(10) Patent No.: US 8,745,293 B2
(45) Date of Patent: Jun. 3, 2014

(54) DATA PROCESSOR

(75) Inventors: Atsushi Kobayashi, Osaka (JP); Takashi Mori, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 178 days.

(21) Appl. No.: 12/137,119

(22) Filed: Jun. 11, 2008

(65) Prior Publication Data

US 2009/0070501 A1   Mar. 12, 2009

(30) Foreign Application Priority Data

Sep. 6, 2007 (JP) ................................. 2007-232092

(51) Int. Cl.
*G06F 13/12* (2006.01)
*H03M 7/00* (2006.01)

(52) U.S. Cl.
USPC .......................................... 710/70; 341/106

(58) Field of Classification Search
CPC .............................................. H03M 7/00–7/28
See application file for complete search history.

(56) References Cited

U.S. PATENT DOCUMENTS

| | | | | |
|---|---|---|---|---|
| 6,501,508 B1 * | 12/2002 | Song et al. | ...................... | 348/441 |
| 6,646,576 B1 * | 11/2003 | Delvaux et al. | ................. | 341/60 |
| 6,799,232 B1 * | 9/2004 | Wang | ............................... | 710/65 |
| 2004/0263495 A1 * | 12/2004 | Sugino et al. | ................. | 345/204 |
| 2006/0106988 A1 * | 5/2006 | Khawand et al. | ............. | 711/130 |
| 2007/0073904 A1 * | 3/2007 | Leung et al. | ................... | 709/247 |
| 2007/0279328 A1 * | 12/2007 | Takada et al. | ................... | 345/63 |
| 2008/0013495 A1 * | 1/2008 | Chen et al. | ..................... | 370/335 |
| 2008/0192867 A1 * | 8/2008 | Mehrnia et al. | ............... | 375/343 |

FOREIGN PATENT DOCUMENTS

| | | |
|---|---|---|
| JP | 62-99849 | 5/1987 |
| JP | 63-153629 | 6/1988 |
| JP | 03-160550 | 7/1991 |
| JP | 8-179924 | 7/1996 |
| JP | 2004-240713 | 8/2004 |

OTHER PUBLICATIONS

Office Action issued Jan. 17, 2012, in Japanese Patent Application No. 2007-232092, filed Sep. 6, 2007 (with English-language Translation).

\* cited by examiner

*Primary Examiner* — Ilwoo Park
(74) *Attorney, Agent, or Firm* — Oblon, Spivak, McClelland, Maier & Neustadt, L.L.P.

(57) ABSTRACT

A format converter includes a first input buffer for storing input data, an output buffer for storing output data, a converter connected between the first input buffer and the output buffer, and a register that the converter refers to. The register allows plural kinds of conversion patterns to be defined in conformity with a desired data format conversion. The converter generates the output data based on the input data, in accordance with the conversion pattern defined in the register.

9 Claims, 32 Drawing Sheets

CP

| ITEM | DEFINED VALUE |
|---|---|
| CYCLE K1 | "0" OR "1" OR "2" OR "3" |
| INITIAL VALUE OF CYCLE K2 | "0" OR "1" OR "2" OR "3" |
| UPDATE OF INPUT DATA K3 | "0" OR "1" |
| MODE K4 | "0" OR "1" OR "2" OR "3" |
| SOURCE K5 | DEFINE ONE CODE OUT OF "0" TO "f" FOR EACH LANE |

| CODE | SOURCE INFORMATION |
|---|---|
| 0 | CHB0 |
| 1 | CHB1 |
| 2 | CHB2 |
| 3 | CHB3 |
| 4 | CHB4 |
| 5 | CHB5 |
| 6 | CHB6 |
| 7 | CHB7 |
| 8 | PHB0 |
| 9 | PHB1 |
| a | PHB2 |
| b | PHB3 |
| c | PHB4 |
| d | PHB5 |
| e | PHB6 |
| f | PHB7 |

| CODE | SOURCE INFORMATION |
|---|---|
| 0 | CHB0 |
| 1 | CHB1 |
| 2 | CHB2 |
| 3 | CHB3 |
| 4 | CHB4 |
| 5 | CHB5 |
| 6 | CHB6 |
| 7 | CHB7 |
| 8 | PHB0 |
| 9 | PHB1 |
| a | PHB2 |
| b | PHB3 |
| c | PHB4 |
| d | PHB5 |
| e | FV |
| f | NC |

| CODE | SOURCE INFORMATION |
|---|---|
| 0 | CHB0 |
| 1 | CHB1 |
| 2 | CHB2 |
| 3 | CHB3 |
| 4 | CHB4 |
| 5 | CHB5 |
| 6 | CHB6 |
| 7 | CHB7 |
| 8 | PHB2 |
| 9 | PHB3 |
| a | PHB4 |
| b | PHB5 |
| c | PHB6 |
| d | PHB7 |
| e | FV |
| f | NC |

| ITEM | DEFINED VALUE |
|---|---|
| CYCLE K1 | "0" |
| INITIAL VALUE OF CYCLE K2 | "0" |
| UPDATE OF INPUT DATA K3 | "1" |
| MODE K4 | "0" |
| SOURCE K5 | "0" "1" "2" "3" "4" "5" "6" "7" |

| ITEM | DEFINED VALUE |
|---|---|
| CYCLE K1 | "0" |
| INITIAL VALUE OF CYCLE K2 | "0" |
| UPDATE OF INPUT DATA K3 | "1" |
| MODE K4 | "0" |
| SOURCE K5 | "6" "7" "4" "5" "2" "3" "0" "1" |

| ITEM | DEFINED VALUE |
|---|---|
| CYCLE K1 | "3" |
| INITIAL VALUE OF CYCLE K2 | "0" |
| UPDATE OF INPUT DATA K3 | "1" |
| MODE K4 | "2" |
| SOURCE K5 | "0" "1" "f" "f" "f" "f" "f" "f" |

<CP21>

| UPDATE OF INPUT DATA K3 | "1" |
|---|---|
| MODE K4 | "2" |
| SOURCE K5 | "f" "f" "0" "1" "f" "f" "f" "f" |

<CP22>

| UPDATE OF INPUT DATA K3 | "1" |
|---|---|
| MODE K4 | "2" |
| SOURCE K5 | "f" "f" "f" "f" "0" "1" "f" "f" |

<CP23>

| UPDATE OF INPUT DATA K3 | "1" |
|---|---|
| MODE K4 | "2" |
| SOURCE K5 | "f" "f" "f" "f" "f" "f" "0" "1" |

| ITEM | DEFINED VALUE |
|---|---|
| CYCLE K1 | "3" |
| INITIAL VALUE OF CYCLE K2 | "0" |
| UPDATE OF INPUT DATA K3 | "1" |
| MODE K4 | "0" |
| SOURCE K5 | "0" "1" "0" "1" "0" "1" "0" "1" |

<CP31>

| UPDATE OF INPUT DATA K3 | "0" |
|---|---|
| MODE K4 | "0" |
| SOURCE K5 | "2" "3" "2" "3" "2" "3" "2" "3" |

<CP32>

| UPDATE OF INPUT DATA K3 | "0" |
|---|---|
| MODE K4 | "0" |
| SOURCE K5 | "4" "5" "4" "5" "4" "5" "4" "5" |

<CP33>

| UPDATE OF INPUT DATA K3 | "0" |
|---|---|
| MODE K4 | "0" |
| SOURCE K5 | "6" "7" "6" "7" "6" "7" "6" "7" |

| ITEM | DEFINED VALUE |
| --- | --- |
| CYCLE K1 | "3" |
| INITIAL VALUE OF CYCLE K2 | "0" |
| UPDATE OF INPUT DATA K3 | "1" |
| MODE K4 | "2" |
| SOURCE K5 | "0" "1" "2" "4" "5" "6" "f" "f" |

<CP41>

| | |
| --- | --- |
| UPDATE OF INPUT DATA K3 | "1" |
| MODE K4 | "2" |
| SOURCE K5 | "f" "f" "f" "f" "f" "f" "0" "1" |

<CP42>

| | |
| --- | --- |
| UPDATE OF INPUT DATA K3 | "1" |
| MODE K4 | "0" |
| SOURCE K5 | "a" "c" "d" "e" "0" "1" "2" "4" |

<CP43>

| | |
| --- | --- |
| UPDATE OF INPUT DATA K3 | "1" |
| MODE K4 | "0" |
| SOURCE K5 | "d" "e" "0" "1" "2" "4" "5" "6" |

| ITEM | DEFINED VALUE |
|---|---|
| CYCLE K1 | "3" |
| INITIAL VALUE OF CYCLE K2 | "0" |
| UPDATE OF INPUT DATA K3 | "1" |
| MODE K4 | "3" |
| SOURCE K5 | "0" "1" "2" "e" "3" "4" "5" "e" |

<CP51>

| UPDATE OF INPUT DATA K3 | "1" |
|---|---|
| MODE K4 | "3" |
| SOURCE K5 | "c" "d" "0" "e" "1" "2" "3" "e" |

<CP52>

| UPDATE OF INPUT DATA K3 | "1" |
|---|---|
| MODE K4 | "3" |
| SOURCE K5 | "a" "b" "c" "e" "d" "0" "1" "e" |

<CP53>

| UPDATE OF INPUT DATA K3 | "0" |
|---|---|
| MODE K4 | "3" |
| SOURCE K5 | "2" "3" "4" "e" "5" "6" "7" "e" |

DATA PROCESSOR

CROSS-REFERENCE TO RELATED APPLICATIONS

This application claims priority to Japanese Patent Application No. 2007-232092. The entire disclosure of Japanese Patent Application No. 2007-232092 is hereby incorporated herein by reference.

BACKGROUND OF THE INVENTION

1. Field of the Invention

The present invention generally relates to a data processor, and more particularly to a data format converter that converts the format of input data into a different format for outputting.

2. Description of the Background Art

In a SoC (System on a Chip) such as the one for a DSC (Digital Still Camera), for example, the format of data to be stored in a memory needs to be converted into a format that is compatible with an internal peripheral circuit (data format conversion).

In conventional SoCs, data format conversion has been processed by software processing via a CPU. However, since software processing via a CPU takes long time, data format conversion is recently performed by using a dedicated hardware.

Japanese Patent Application Publication No. 2004-240713 discloses a technique for converting input data into data having a different number of bits.

Furthermore, Japanese Patent Application Publication No. 3-160550 (1991) discloses a technique for one of the data format conversions, endian conversion.

Time required for data format conversion can be reduced by using a dedicated hardware, in comparison to software processing via a CPU. On the other hand, there are various kinds of data format conversions such as endian conversion, packing, unpacking, etc., and a dedicated hardware can perform only one intended kind of conversion. Hence, in order to perform plural kinds of conversions, a separate hardware dedicated to each different conversion is required, which causes a problem that the overall circuit size increases.

SUMMARY OF THE INVENTION

It is an object of the present invention to provide a data processor that reduces time required for conversions in comparison to software processing, and is capable of processing plural kinds of data format conversions.

According to a first aspect of the present invention, a data processor includes a first input buffer for storing input data, an output buffer for storing output data, a data converter connected between the first input buffer and the output buffer, and a register that the data converter refers to, wherein the register allows plural kinds of conversion patterns to be defined in conformity with a desired data format conversion, and the data converter generates the output data based on the input data, in accordance with the conversion pattern defined in the register.

The register allows plural kinds of conversion patterns to be defined in conformity with a desired data format conversion. The data converter generates the output data based on the input data, in accordance with the conversion pattern defined in the register. Thus a data processor that reduces required time in comparison to software processing and is capable of processing plural kinds of data format conversions can be obtained.

Preferably, the data processor further includes a second input buffer, wherein first input data is stored in the first input buffer, and second input data that has been inputted prior to the first input data is stored in the second input buffer, and the data converter generates the output data based on the first input data set and the second input data, in accordance with the conversion pattern defined in the register.

The data converter generates the output data utilizing not only the first input data but also the second input data that has previously been inputted. This increases kinds of data format conversions that the data processor is capable of processing.

Preferably, in the data processor, the register allows a plurality of conversion patterns to be sequentially defined for processing one data format conversion, and the data converter generates the output data based on the input data, in accordance with the plurality of conversion patterns sequentially defined in the register.

The data converter is capable of processing not only a data format conversion realized by defining only one conversion pattern, but also a data format conversion requiring a plurality of conversion patterns to be defined. This increases kinds of data format conversions that the data processor is capable of processing.

Preferably, in the data processor, whether or not to input subsequent input data to the first input buffer synchronously with an update of a conversion pattern defined in the register to a subsequent conversion pattern is defined by the subsequent conversion pattern.

Fetch of subsequent input data into the first input buffer can be prevented, even if a conversion pattern defined in the register is updated to a subsequent conversion pattern. Hence when a transmission rate of input data inputted to the data processor is lower than that of output data outputted from the data processor, fetch of subsequent input data into the first input buffer can be suspended. This absorbs difference in the transmission rate, and thus achieves a proper data format conversion.

Preferably, in the data processor, the output buffer includes a plurality of data storage areas, and the output data is outputted from the output buffer when all of the plurality of data storage areas are filled with sectional output data.

When a transmission rate of input data inputted to the data processor is higher than that of output data outputted from the data processor, output of data from the output buffer can be suspended. This absorbs difference in the transmission rate, and thus achieves proper processing of a data format conversion.

Preferably, in the data processor, when the data converter generates the output data based on the input data, the conversion pattern allows for defining that no section of input data currently stored in the first input buffer is copied for a desired section of the output data.

The data converter does not always utilize copy of input data for generating output data, but it is possible that no section of input data currently stored in the first input buffer is copied for a desired section of output data. This increases kinds of data format conversions that the data processor is capable of processing.

Preferably, in the data processor, the conversion pattern is created based on at least one of a plurality of tables in which a plurality of codes and source information indicating a section of input data to be copied for generating output data in relation to each code are described, a specific code represents information indicating no section of the input data is copied, instead of the source information, and source information to be omitted for assigning the specific code is different among the plurality of tables.

A plurality of tables is prepared, among which different source information is omitted for assigning a specific code. Selecting an appropriate table from the plurality of tables helps to avoid the situation that always the same source information becomes unavailable in order to assign a specific code.

Preferably, in the data processor, when the data converter generates the output data based on the input data, the conversion pattern allows for defining that a fixed value is utilized for a desired section of the output data regardless of the input data.

The data converter does not always utilize copy of input data to generate output data, but a fixed value may be utilized for a desired section of output data. This increases kinds of data format conversions that the data processor is capable of processing.

Preferably, in the data processor, the conversion pattern is created based on at least one of a plurality of tables in which a plurality of codes and source information indicating a section of input data to be copied for generating output data in relation to each code are described, a specific code represents information indicating a fixed value is utilized regardless of the input data, instead of source information, and source information to be omitted for assigning the specific code is different among the plurality of tables.

A plurality of tables is prepared, among which different source information is omitted for assigning a specific code. Selecting an appropriate table from the plurality of tables helps to avoid the situation that always the same source information becomes unavailable in order to assign a specific code.

These and other objects, features, aspects and advantages of the present invention will become more apparent from the following detailed description of the present invention when taken in conjunction with the accompanying drawings.

BRIEF DESCRIPTION OF THE DRAWINGS

FIG. 8 illustrates an item.
FIG. 9 illustrates an item.
FIG. 10 illustrates an item.

FIG. 11 is a detailed diagram illustrating definitions of a conversion pattern.

FIG. 13 is a detailed diagram illustrating definitions of a conversion pattern.

FIG. 15 is a detailed diagram illustrating definitions of a conversion pattern.

FIG. 20 is a detailed diagram illustrating definitions of a conversion pattern.

FIG. 25 is a detailed diagram illustrating definitions of a conversion pattern.

FIG. 30 is a detailed diagram illustrating definitions of a conversion pattern.

DESCRIPTION OF THE PREFERRED EMBODIMENTS

Figure 1:
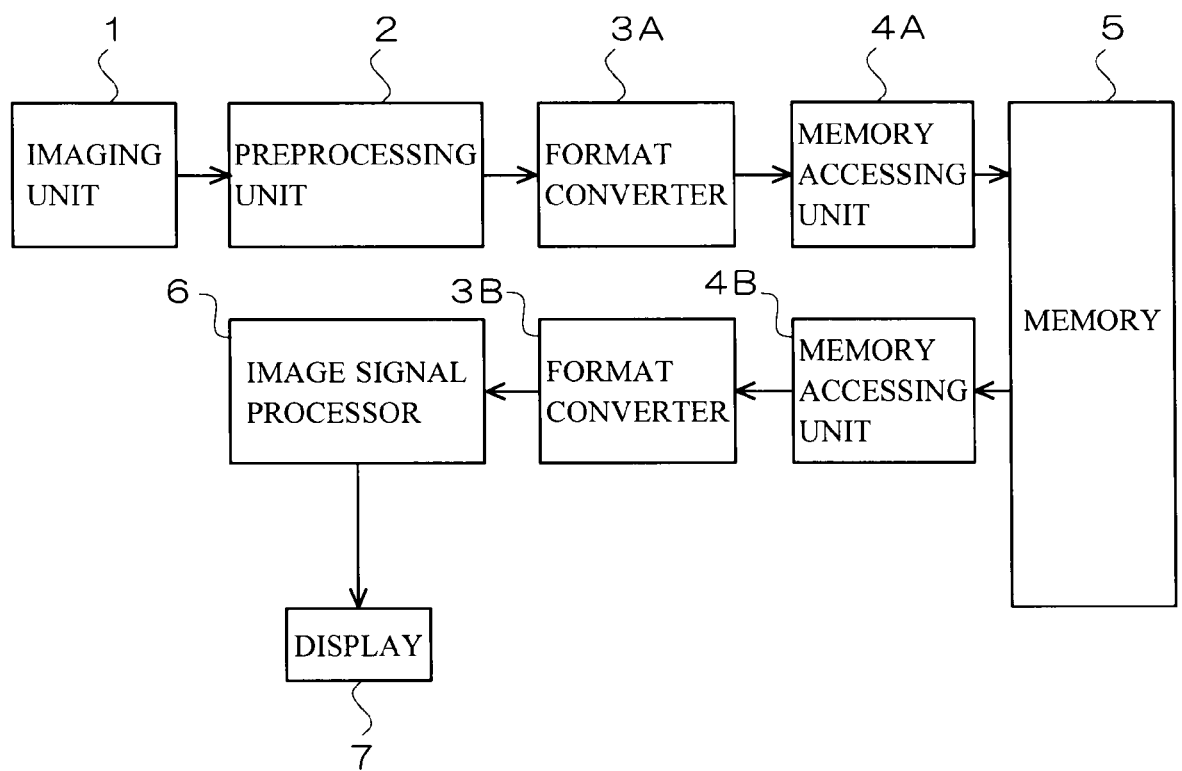
FIG. 1 is a block diagram showing an overview of a digital camera as an example to which the present invention is applied.

Preferred embodiments of the present invention are described in detail below referring to the drawings. It should be noted that identical reference numerals throughout the drawings indicate identical or equivalent elements.

FIG. 1 is a block diagram showing an overview of a digital camera as an example to which the present invention is applied. As shown in FIG. 1, a digital camera includes an imaging unit 1 such as a CCD, a preprocessing unit 2, format converters 3A and 3B, memory accessing units 4A and 4B employing DMA, a memory 5 such as a DRAM, an image signal processor 6, and a display 7 such as an LCD.

Image data outputted from the imaging unit 1 is inputted to the preprocessing unit 2. The preprocessing unit 2 performs a predetermined preprocessing such as white balance correction and exposure correction on the image data inputted from the imaging unit 1. The image data outputted from the preprocessing unit 2 is inputted to the format converter 3A. The format converter 3A converts the format of the image data inputted from the preprocessing unit 2 into a different format. Details of processing in the format convert 3A are described below. The memory accessing unit 4A writes the image data outputted from the format converter 3A to the memory 5.

The memory accessing unit 4B reads the image data stored in the memory 5. The format converter 3B converts the format of the image data read from the memory 5 into a different format. Details of processing in the format converter 3B are described below. In the explanations below, each of the format converter 3A and the format converter 3B is generally referred to as a format converter 3. The image data outputted from the format converter 3B is inputted to the image signal processor 6. The image signal processor 6 performs various kinds of image processing on the image data inputted from the format converter 3B. The image data processed by the image signal processor 6 is inputted to the display 7, and the display 7 then displays an image.

FIG. 1 shows an example of employing separate memory accessing units 4A and 4B for writing to and reading from a memory 5. When writing to and reading from a memory 5 do not occur at the same time, one memory accessing unit may serve as both memory accessing units 4A and 4B. In such a case, one format converter may serve as both format converters 3A and 3B, as well.

Figure 2:
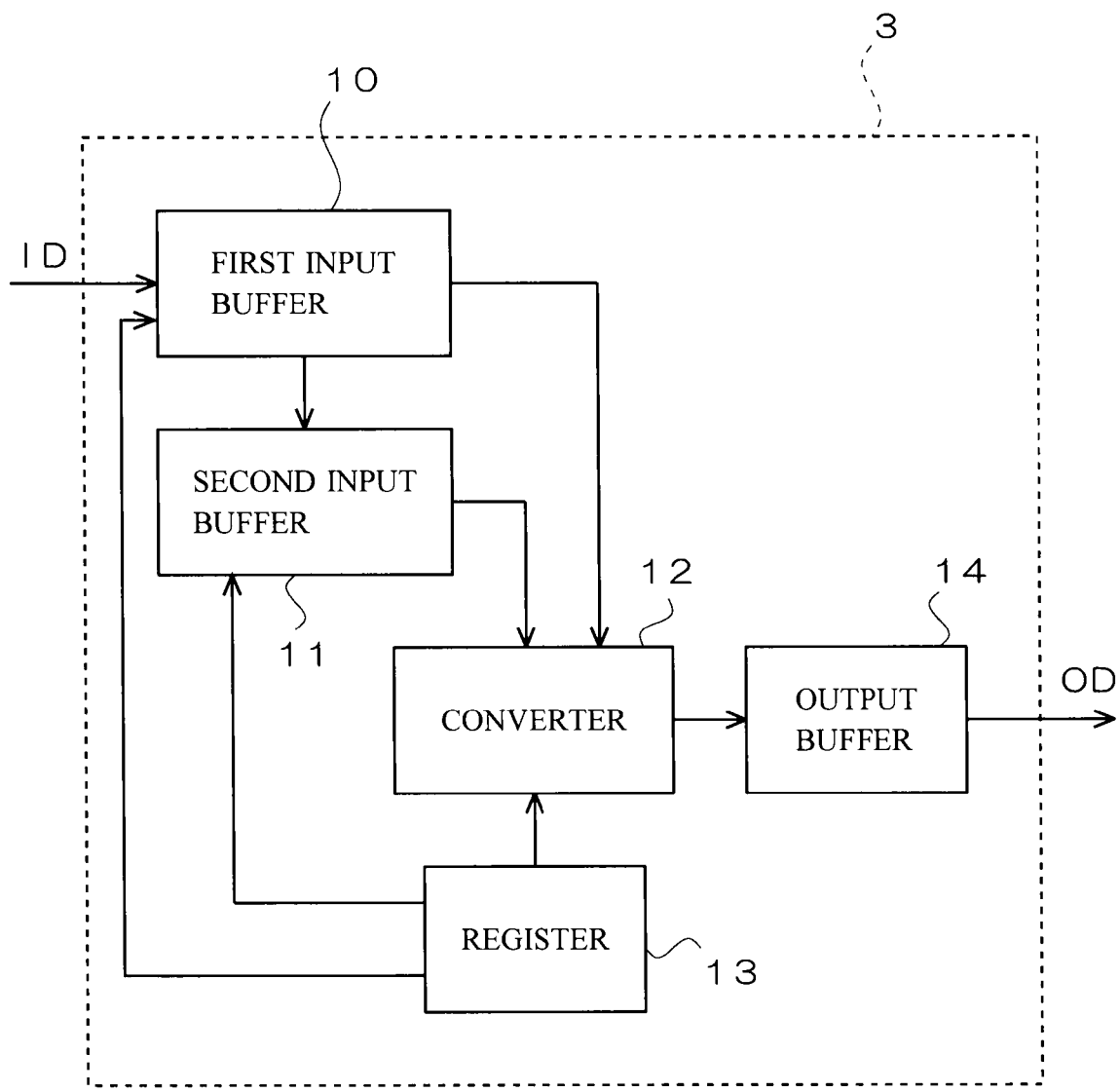
FIG. 2 is a block diagram showing a configuration of a format converter.

FIG. 2 is a block diagram showing a configuration of the format converter 3. As shown in FIG. 2, the format converter 3 includes a first input buffer 10, a second input buffer 11, a converter (data converter) 12, a register 13, and an output buffer 14.

Input data ID is inputted from a circuit preceding the format converter 3 (the preprocessing unit 2 or the memory accessing unit 4B) to the first input buffer 10 and stored there. That is, the newest input data ID is stored in the first input buffer 10.

When new input data ID is fetched into the first input buffer 10, the input data ID that has been stored in the first input buffer 10 is inputted to the second input buffer 11 and stored there. That is, the previous input data ID (the immediately preceding input data ID, in this example) inputted to the format converter 3 prior to the newest input data ID is stored in the second input buffer 11.

In the output buffer 14, output data OD to be outputted from the format converter 3 is stored.

The converter 12 can refer to the register 13. The register 13 allows plural kinds of conversion patterns CP to be defined in conformity with a desired data format conversion. Details are described below.

The converter 12 is connected between the first and second input buffers 10 and 11 and the output buffer 14. The converter 12 generates the output data OD based on the input data ID stored in the first and second input buffers 10 and 11, in accordance with the conversion pattern CP defined in the register 13.

Figure 3:
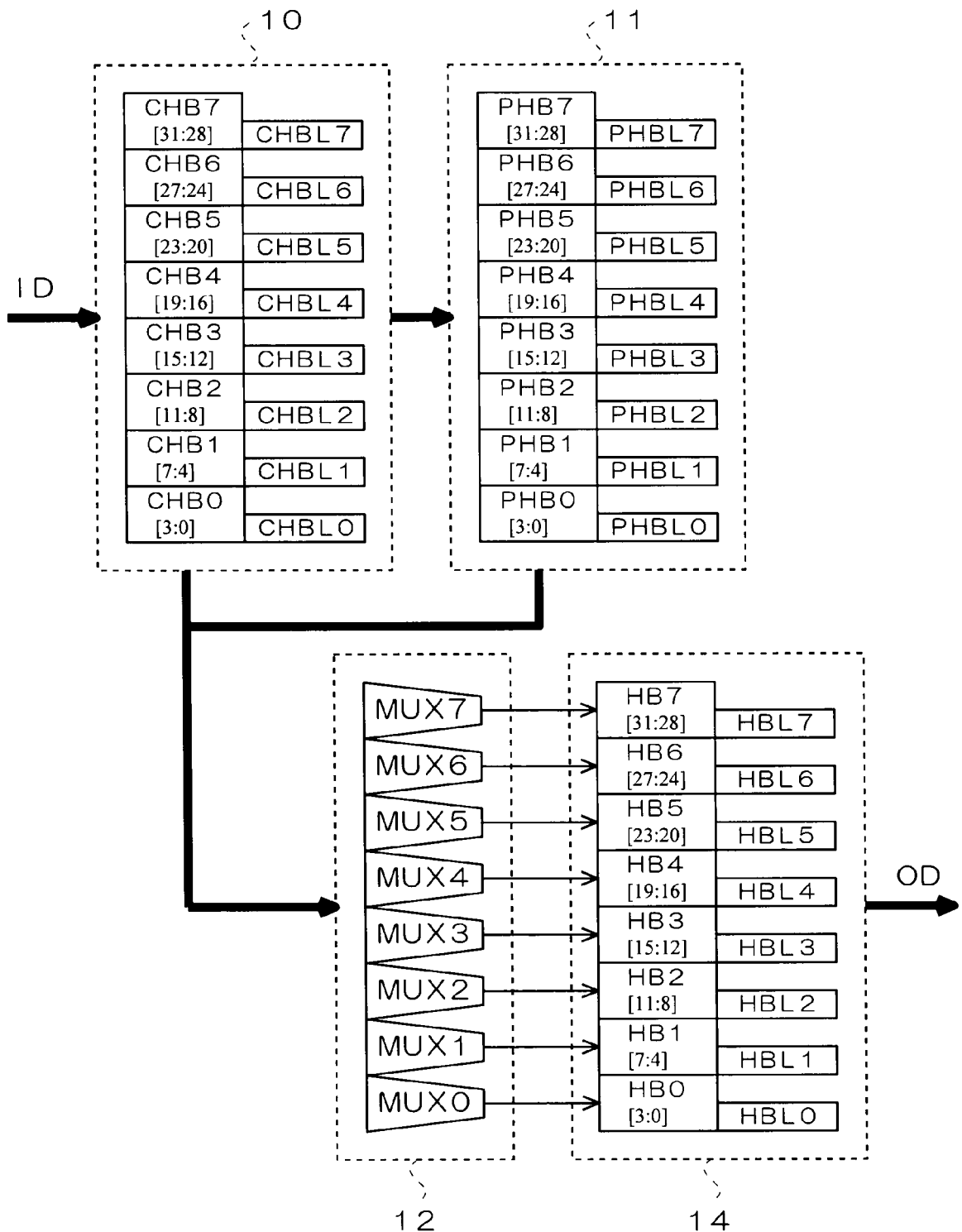
FIG. 3 shows a first input buffer, a second input buffer, an output buffer, and a converter.

FIG. 3 shows the first input buffer 10, the second input buffer 11, the output buffer 14, and the converter 12. The following example illustrates a case when input data ID of 32 bits is inputted.

The first input buffer 10 includes eight data storage areas CHB0 to CHB7, each consisting of 4 bits. When input data ID is externally inputted to the first input buffer 10, the 32-bit input data ID is divided into eight sets of sectional input data, each set consisting of 4 bits, and then stored in the data storage areas CHB0 to CHB7, respectively. For example, the sectional input data set corresponding to the lower 4 bits of the input data ID is stored in the data storage area CHB0, and the sectional input data set corresponding to the upper 4 bits of the input data ID is stored in the data storage area CHB7.

Similarly, the second input buffer 11 includes eight data storage areas PHB0 to PHB7, each consisting of 4 bits. When new input data ID is fetched into the first input buffer 10, the sectional input data sets that have been stored in each of the data storage areas CHB0 to CHB7 of the first input buffer 10 are respectively transmitted to the data storage areas PHB0 to PHB7 of the second input buffer 11 and stored there. For example, the sectional input data set stored in the data storage area CHB0 of the first input buffer 10 is stored in the data storage area PHB0 of the second input buffer 11, and the sectional input data set stored in the data storage area CHB7 of the first input buffer 10 is stored in the data storage area PHB7 of the second input buffer 11.

Similarly, the output buffer 14 includes eight data storage areas HB0 to HB7, each consisting of 4 bits. Sectional output data sets, each consisting of 4 bits, are respectively stored in the data storage areas HB0 to HB7. When all of the eight data storage areas HB0 to HB7 are filled with the sectional output data, eight sets of the sectional output data are outputted from the output buffer 14 as one set of output data OD. For example, the sectional output data set stored in the data storage area HB0 forms the lower 4 bits of the output data OD, and the sectional output data set stored in the data storage area HB7 forms the upper 4 bits of the output data OD.

In FIG. 3, flags CHBL0 to CHBL7, PHBL0 to PHBL7, and HBL0 to HBL7 are provided on the lower right side of each of the data storage areas CHB0 to CHB7, PHB0 to PHB7, and HB0 to HB7. These are flags, each consisting of 1 bit and indicating whether the data stored in the data storage area to which the flag is attached is significant or not.

The converter 12 includes eight multiplexers MUX0 to MUX7 corresponding to the data storage areas HB0 to HB7. For example, the multiplexer MUX0 corresponds to the data storage area HB0, and the multiplexer MUX7 corresponds to the data storage area HB7. 32 bits are divided into eight areas and each area is hereinafter referred to as a lane. For example, the multiplexer MUX0 and the data storage area HB0 belong to the 0th lane, and the multiplexer MUX7 and the data storage area HB7 belong to the 7th lane.

Each of the multiplexers MUX0 to MUX7 copies the sectional input data stored in one of the data storage areas CHB0 to CHB7 and PHB0 to PHB7, and then stores the data in the corresponding one of the data storage areas HB0 to HB7. The source is specified by the conversion pattern CP defined in the register 13.

Figures 4, 5:
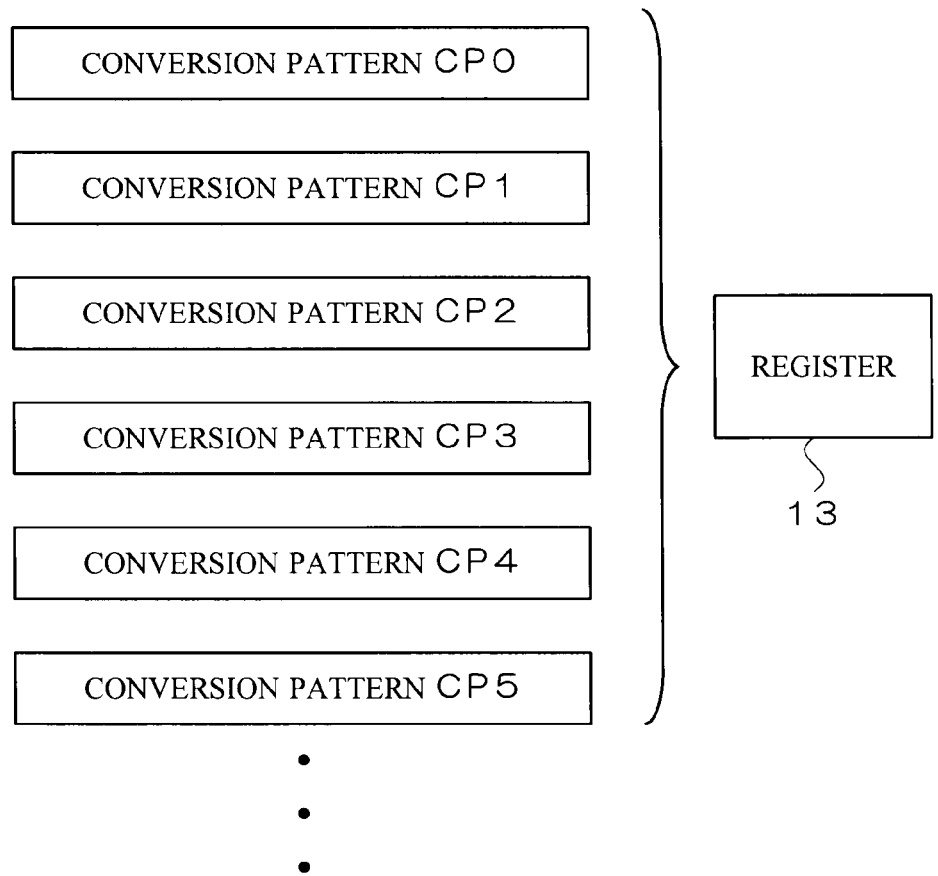
FIG. 4 shows how a conversion pattern is defined in the register.
FIG. 5 is a detailed diagram illustrating definitions of the conversion pattern.

FIG. 4 shows how the conversion pattern CP is defined in the register 13. As shown in FIG. 4, the register 13 allows plural kinds of conversion patterns CP0 to CP5 to be selected and defined therein. For example, the conversion pattern CP1 is a conversion pattern for endian conversion, the conversion pattern CP2 is for extraction of a byte of interest, the conversion pattern CP3 is for expansion of each byte, the conversion pattern CP4 is for packing 12 bits to 16 bits, and the conversion pattern CP5 is for unpacking 16 bits to 12 bits. Furthermore, the conversion pattern CP0 is a conversion pattern for no conversion.

In conformity with a data format conversion desired by a user, a CPU (not shown in the figure) selects a conversion pattern which corresponds to the data format conversion from the conversion patterns CP0 to CP5, and defines it in the register 13. The kind and number of the conversion patterns that can be defined in the register 13 are not limited to the example shown in FIG. 4, but an arbitrary kind and an arbitrary number of conversion patterns can be defined.

As described above, according to the format converter 3 of the present embodiment, the register 13 allows plural kinds of conversion patterns CP0 to CP5 to be defined in conformity with a desired data format conversion. Then the converter 12 generates the output data OD based on the input data ID, in accordance with the conversion pattern CP defined in the register 13. Thus a data processor that reduces required time in comparison to software processing and is capable of processing plural kinds of data format conversions can be obtained.

Furthermore, the converter 12 generates the output data OD utilizing not only the input data ID currently stored in the first input buffer 10 but also the input data ID that has previously been inputted and is stored in the second input buffer 11. This increases kinds of data format conversions that the data processor is capable of processing.

FIG. 5 is a detailed diagram illustrating definitions of the conversion pattern CP. In the example in FIG. 5, items K1 defining a cycle, K2 defining an initial value of the cycle, K3 defining an update of input data, K4 defining a mode, and K5 defining a source are provided. The kind and number of the items to be defined are not limited to the example shown in FIG. 5, but an arbitrary kind and an arbitrary number of items can be prepared.

Figure 6:
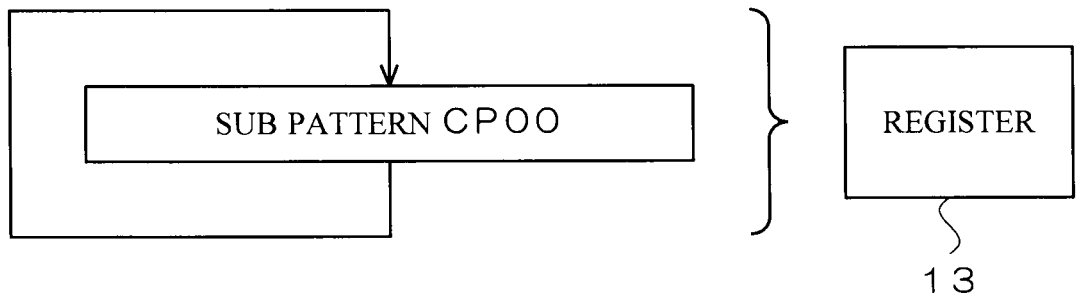
FIG. 6 illustrates an item.
Figure 7:
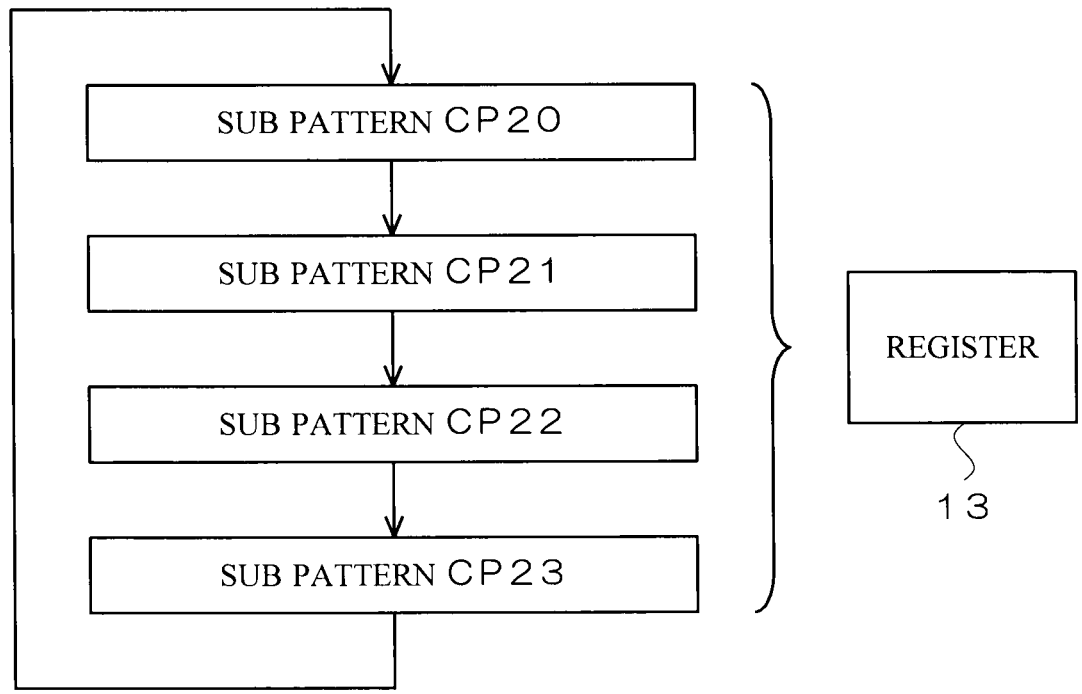
FIG. 7 illustrates an item.

The item K1 shown in FIG. 5 is first described. FIGS. 6 and 7 illustrate the item K1. Referring to FIG. 6, according to the conversion pattern CP0, for example, an intended data format conversion is completed by defining a conversion pattern once in the register 13. That is, the conversion pattern CP0 consists of only one conversion pattern CP00 (hereinafter each conversion pattern constituting the conversion pattern CP is referred to as a sub pattern). In this case, by defining the item K1 as "0", one sub pattern CP00 is repeatedly defined in the register 13.

Referring now to FIG. 7, according to the conversion pattern CP2, for example, an intended data format conversion is completed by defining a conversion pattern four times in the register 13. That is, the conversion pattern CP2 consists of four sub patterns CP20 to CP23. In this case, by defining the item K1 as "3", the four sub patterns CP20 to CP23 are cyclically defined in this order in the register 13.

As described above, according to the format converter 3 of the present embodiment, the converter 12 is capable of processing not only a data format conversion realized by defining only one sub pattern, but also a data format conversion requiring a plurality of sub patterns to be defined. This increases kinds of data format conversions that the data processor is capable of processing.

Next, the item K2 shown in FIG. 5 is described. The item K2 specifies which sub pattern should be first defined in the register 13 within a cycle, when a value of "1" or a bigger number is defined for the item K1, i.e., when two or more sub patterns exist. Referring to FIG. 7, when the item K2 is defined as "0", for example, the sub pattern CP20 is defined as the initial sub pattern. When the item K2 is defined as "2", the sub pattern CP22 is defined as the initial sub pattern.

The item K3 shown in FIG. 5 is now described. The item K3 is for defining whether or not to fetch new input data into the first input buffer 10. When the item K3 is defined as "0", new input data ID is not fetched into the first input buffer 10. That is, what is stored in the first input buffer 10 (and the second input buffer 11) is maintained. In contrast, when the item K3 is defined as "1", new input data ID is fetched into the first input buffer 10. As described above, when the new input data ID is fetched into the first input buffer 10, the input data ID that has been stored in the first input buffer 10 is inputted to the second input buffer 11 and stored there.

Thus, according to the format converter 3 of the present embodiment, fetch of subsequent input data ID into the first input buffer 10 can be prevented, even if a conversion pattern or a sub pattern defined in the register 13 is updated to a subsequent conversion pattern or sub pattern by defining the item K3 as "0". Hence when a transmission rate of input data ID inputted to the format converter 3 is lower than that of output data OD outputted from the format converter 3, fetch of subsequent input data ID into the first input buffer 10 can be suspended. This absorbs difference in the transmission rate, and thus achieves a proper data format conversion.

Next, the item K4 shown in FIG. 5 is described. FIGS. 8 to 10 illustrate the item K4. Tables TA1 to TA3 for creating the conversion pattern CP are prepared in advance. As shown in FIGS. 8 to 10, correspondence between codes and source information is described in each of the tables TA1 to TA3. The codes are consecutive numbers and alphabets from "0" to "f". The source information indicates a section of input data to be copied for generating output data. Referring to FIG. 3, when the source information is "CHB0", for example, it is indicated that sectional input data stored in the data storage area CHB0 of the first input buffer 10 is to be copied. When the source information is "PHB7", it is indicated that sectional input data stored in the data storage area PHB7 of the second input buffer 11 is to be copied.

When the item K4 is defined as "0" or "1", the table TA1 shown in FIG. 8 is selected. All of the data storage areas CHB0 to CHB7 and PHB0 to PHB7 appear in the column for the source information in the table TA1.

When the item K4 is defined as "2", the table TA2 shown in FIG. 9 is selected. Among all of the data storage areas CHB0 to CHB7 and PHB0 to PHB7, the data storage areas PHB6 and PHB7 do not appear in the column for the source information in the table TA2. Accordingly, when the table TA2 is selected, the data storage areas PHB6 and PHB7 cannot be specified as a source of data.

Instead, in the table TA2, information "FV" and "NC" appear in relation to the codes "e" and "f", respectively. The information "FV" indicates that a fixed value is to be utilized for the sectional output data regardless of the value of the input data. This information may include the fixed value itself (a fixed value of 4 bits, for example). The information "NC" indicates that no section of input data is copied.

Thus, according to the format converter 3 of the present embodiment, the converter 12 does not always utilize copy of input data ID for generating output data OD, but it is possible that no section of the input data ID currently stored in the first input buffer 10 or the second input buffer 11 is copied for a desired section of the output data OD. This increases kinds of data format conversions that the data processor is capable of processing.

Similarly, the converter 12 does not always utilize copy of input data ID to generate output data OD, but a fixed value may be utilized for a desired section of the output data OD. This increases kinds of data format conversions that the data processor is capable of processing.

When the item K4 is defined as "3", the table TA3 shown in FIG. 10 is selected. Among all of the data storage areas CHB0 to CHB7 and PHB0 to PHB7, the data storage areas PHB0 and PHB1 do not appear in the column for the source information in the table TA3. Accordingly, when the table TA3 is selected, the data storage areas PHB0 and PHB1 cannot be specified as a source of data. In the same way as the table TA2 in FIG. 9, the information "FV" and "NC" appear in relation to the codes "e" and "f".

Thus, according to the format converter 3 of the present embodiment, a plurality of tables TA2 and TA3 is prepared, among which different source information is omitted for assigning a specific code. Selecting an appropriate table from the plurality of tables TA2 and TA3 helps to avoid the situation that always the same source information becomes unavailable in order to assign a specific code.

Next, the item K5 shown in FIG. 5 is described. For the item K5, one code out of "0" to "f" is defined for each of the 0th to the 7th lanes. Suppose that the item K4 is defined as "0" (i.e., the table TA1 in FIG. 8 is selected), and the 0th lane in the item K5 is defined as "3", for example. In this case, since the source information in relation to the code "3" in the table TA1 is "CHB3", referring to FIG. 3, the multiplexer MUX0 belonging to the 0th lane copies sectional input data stored in the data storage area CHB3 and stores the data in the data storage area HB3.

Examples of data format conversions are explained in detail below.

<No Conversion (Conversion Pattern CP0)>

FIG. 11 is a detailed diagram illustrating definitions of the conversion pattern CP0 shown in FIG. 4. The items K1, K2, K3, and K4 are defined as "0", "0", "1", and "0", respectively. Furthermore, the 0th to the 7th lanes in the item K5 are defined as "0", "1", "2", "3", "4", "5", "6", and "7", respectively.

Figure 12:
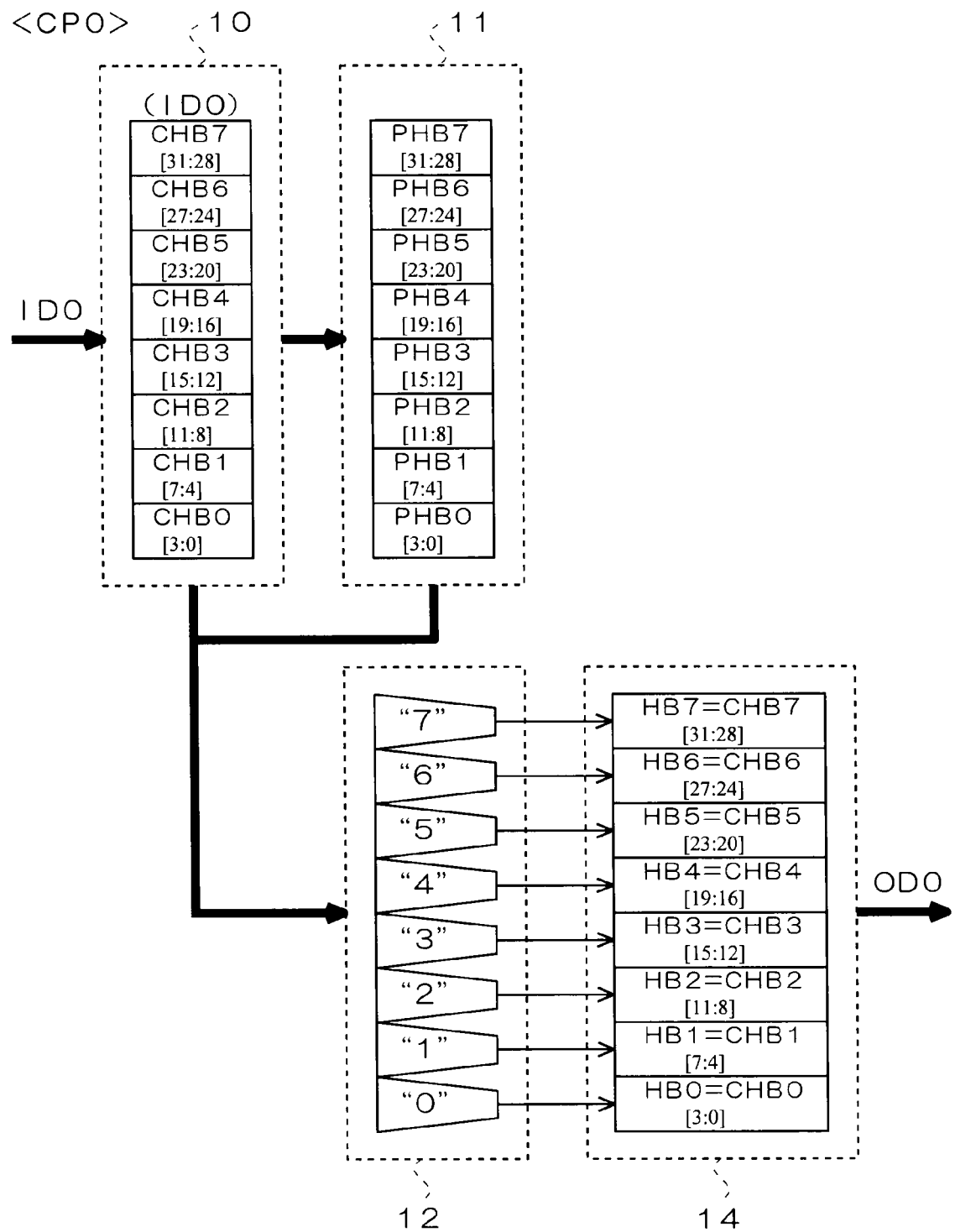
FIG. 12 is a block diagram illustrating how a format converter operates.

FIG. 12 is a block diagram illustrating how the format converter 3 operates when the conversion pattern CP0 is defined in the register 13. Since the item K3 is defined as "1", new input data ID0 is fetched into the first input buffer 10 and stored there.

Since the item K4 is defined as "0", the table TA1 in FIG. 8 is selected. Furthermore, the 0th to the 7th lanes in the item K5 are defined as "0", "1", "2", "3", "4", "5", "6", and "7", respectively. Thus sectional input data sets stored in the data storage areas CHB0, CHB1, CHB2, CHB3, CHB4, CHB5, CHB6, and CHB7 of the first input buffer 10 are respectively copied into the data storage areas HB0, HB1, HB2, HB3, HB4, HB5, HB6, and HB7 of the output buffer 14. Since all of the data storage areas HB0 to HB7 are filled with the sectional output data, eight sets of the sectional output data are outputted from the output buffer 14 as one set of output data OD0.

The output data OD0 is identical to the input data ID0. This means that the input data ID0 inputted to the format converter 3 is outputted as the output data OD0 without any conversion.

<Endian Conversion (Conversion Pattern CP1)>

FIG. 13 is a detailed diagram illustrating definitions of the conversion pattern CP1 shown in FIG. 4. The items K1, K2, K3, and K4 are defined as "0", "0", "1", and "0", respectively. Furthermore, the 0th to the 7th lanes in the item K5 are defined as "6", "7", "4", "5", "2", "3", "0", and "1", respectively.

Figure 14:
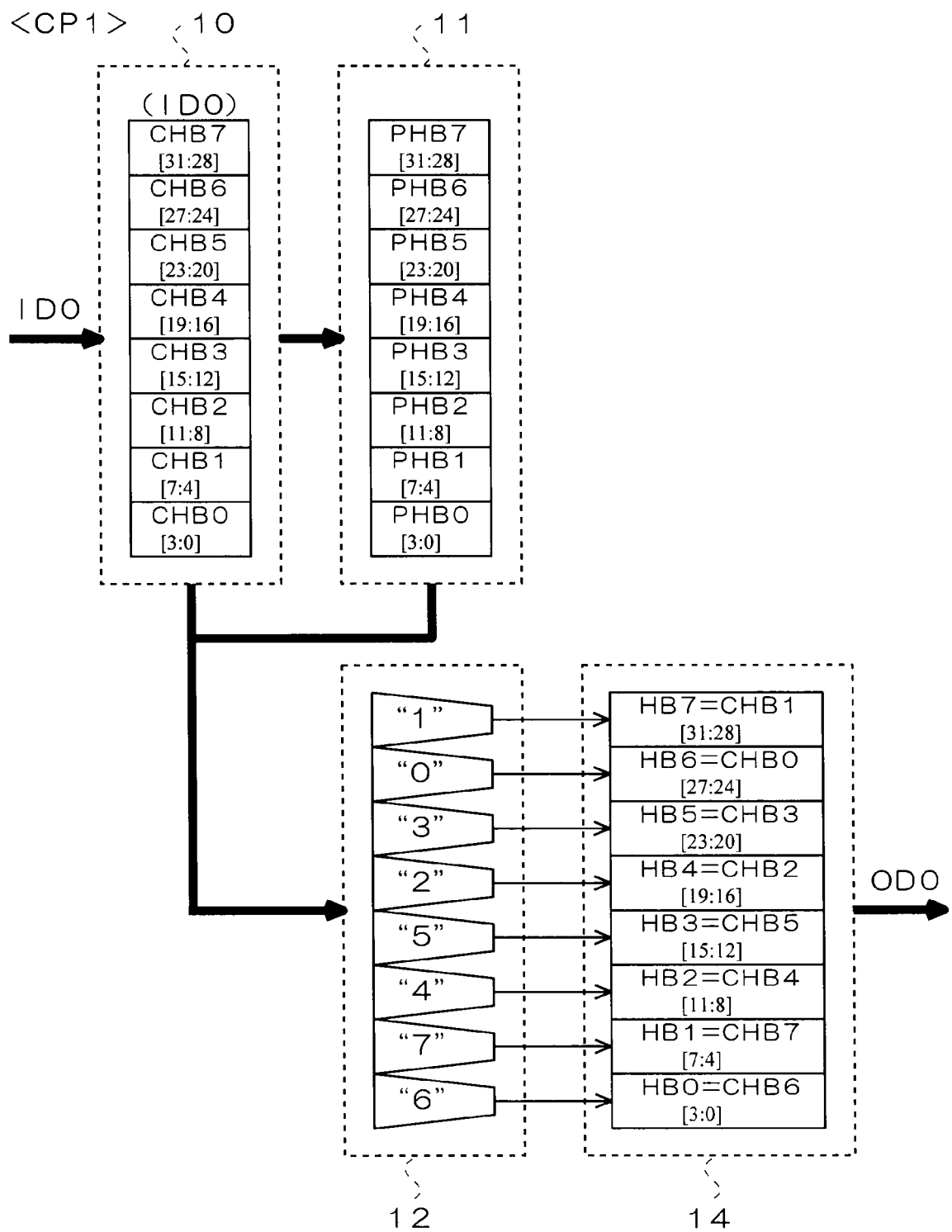
FIG. 14 is a block diagram illustrating how a format converter operates.

FIG. 14 is a block diagram illustrating how the format converter 3 operates when the conversion pattern CP1 is defined in the register 13. Since the item K3 is defined as "1", new input data ID0 is fetched into the first input buffer 10 and stored there.

Since the item K4 is defined as "0", the table TA1 in FIG. 8 is selected. Furthermore, the 0th to the 7th lanes in the item K5 are defined as "6", "7", "4", "5", "2", "3", "0", and "1", respectively. Thus sectional input data sets stored in the data storage areas CHB6, CHB7, CHB4, CHB5, CHB2, CHB3, CHB0, and CHB1 of the first input buffer 10 are respectively copied into the data storage areas HB0, HB1, HB2, HB3, HB4, HB5, HB6, and HB7 of the output buffer 14. Since all of the data storage areas HB0 to HB7 are filled with the sectional output data, eight sets of the sectional output data are outputted from the output buffer 14 as one set of output data OD0.

The 0th (the least significant byte), the 1st, the 2nd, and the 3rd (the most significant byte) bytes of the output data OD0 are identical to the 3rd, the 2nd, the 1st, and the 0th bytes of the input data ID0, respectively. This means that the input data ID0 inputted to the format converter 3 is turned back to front per byte, and then outputted as the output data OD0.

<Extraction of Byte of Interest (Conversion Pattern CP2)>

FIG. 15 is a detailed diagram illustrating definitions of the conversion pattern CP2 shown in FIG. 4. The items K1 and K2 are defined as "3" and "0", respectively. Hence the conversion pattern CP2 consists of four sub patterns CP20, CP21, C22, and CP23, starting with the sub pattern CP20. In FIG. 15, the items K1 and K2 of the sub patterns CP21 to CP23 are not illustrated.

In all of the sub patterns CP20 to CP23, the items K3 and K4 are defined as "1" and "2", respectively. In the sub pattern CP20, the 0th to the 7th lanes in the item K5 are defined as "0", "1", "f", "f", "f", "f", "f", and "f", respectively. In the sub pattern CP21, the 0th to the 7th lanes in the item K5 are defined as "f", "f", "0", "1", "f", "f", "f", and "f", respectively. In the sub pattern CP22, the 0th to the 7th lanes in the item K5 are defined as "f", "f", "f", "f", "0", "1", "f", and "f", respectively. In the sub pattern CP23, the 0th to the 7th lanes in the item K5 are defined as "f", "f", "f", "f", "f", "f", "0", and "1", respectively.

Figure 16:
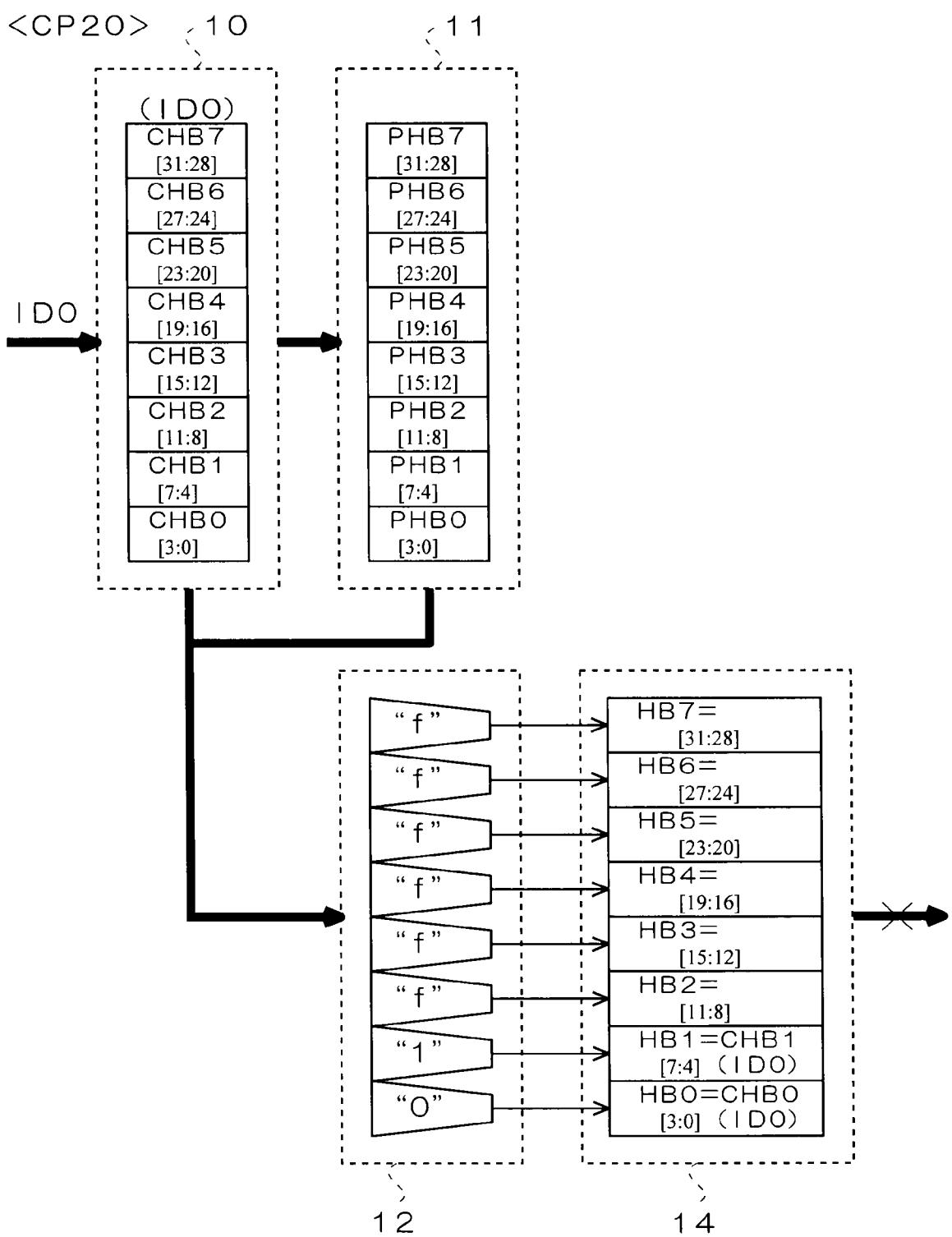
FIG. 16 is a block diagram illustrating how a format converter operates.

FIG. 16 is a block diagram illustrating how the format converter 3 operates when the sub pattern CP20 is defined in the register 13. Since the item K3 is defined as "1", new input data ID0 is fetched into the first input buffer 10 and stored there.

Since the item K4 is defined as "2", the table TA2 in FIG. 9 is selected. Furthermore, the 0th to the 7th lanes in the item K5 are defined as "0", "1", "f", "f", "f", "f", "f", and "f", respectively. Thus sectional input data sets stored in the data storage areas CHB0 and CHB1 of the first input buffer 10 (i.e., the 0th byte of the input data ID0) are respectively copied into the data storage areas HB0 and HB1 of the output buffer 14. No sectional input data is copied into the data storage areas HB2 to HB7 of the output buffer 14.

At this time, sectional output data is not stored in the data storage areas HB2 to HB7. The output data OD0 is therefore not outputted from the output buffer 14. In this case, in response to a read request to the format converter 3 issued by a subsequent circuit, a notification that output data at that time is invalid is sent from the format converter 3 to the subsequent circuit. This prevents incomplete output data from being inputted to the subsequent circuit.

Figure 17:
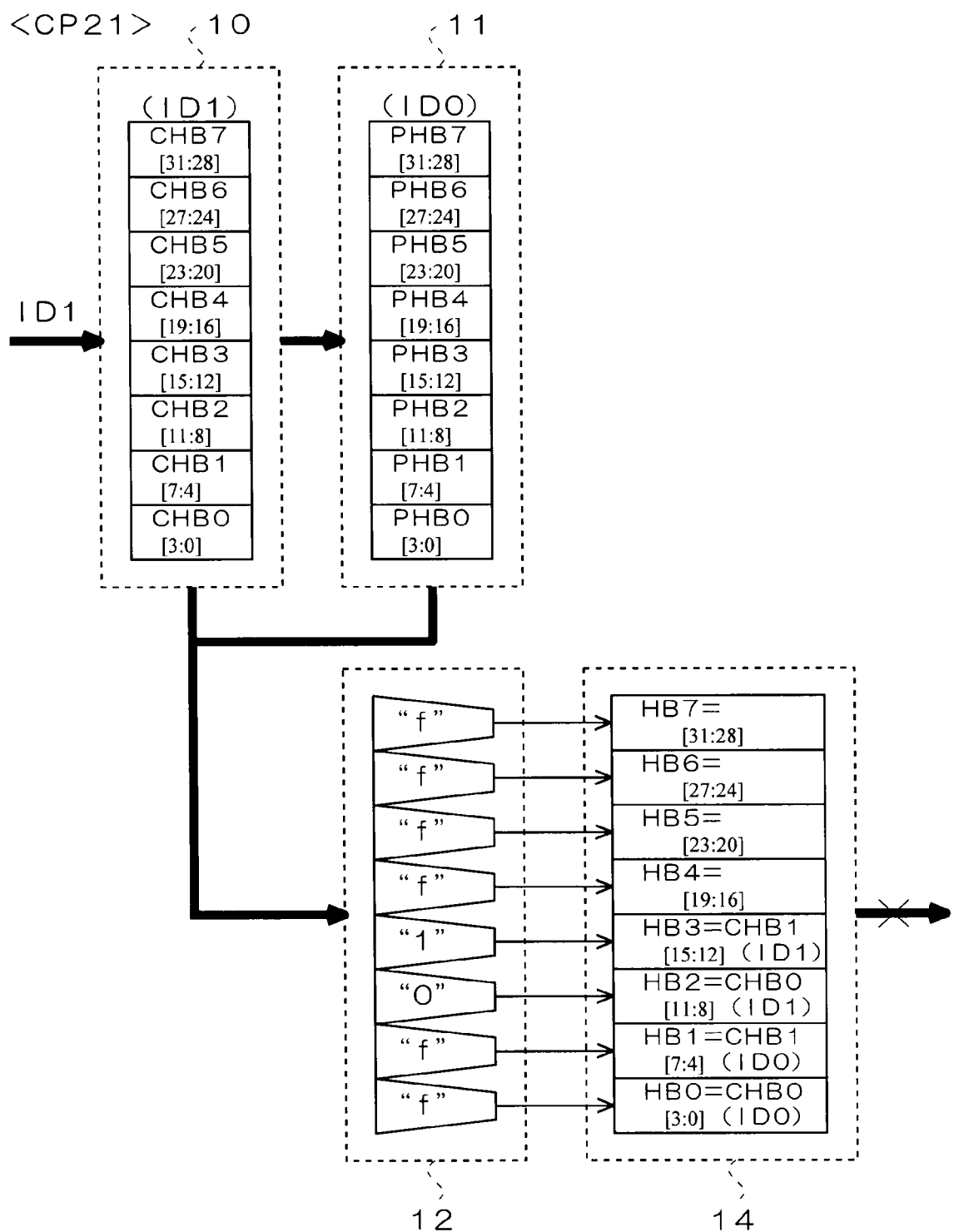
FIG. 17 is a block diagram illustrating how a format converter operates.

FIG. 17 is a block diagram illustrating how the format converter 3 operates when the sub pattern CP21 following the sub pattern CP20 is defined in the register 13. Since the item K3 is defined as "1", new input data ID1 is fetched into the first input buffer 10 and stored there.

Since the item K4 is defined as "2", the table TA2 in FIG. 9 is selected. Furthermore, the 0th to the 7th lanes in the item K5 are defined as "f", "f", "0", "1", "f", "f", "f", and "f", respectively. Thus sectional input data sets stored in the data storage areas CHB0 and CHB1 of the first input buffer 10 (i.e., the 0th byte of the input data ID1) are respectively copied into the data storage areas HB2 and HB3 of the output buffer 14. No sectional input data is copied into the data storage areas HB0, HB1, and HB4 to HB7 of the output buffer 14. At this time, sectional output data is not stored in the data storage areas HB4 to HB7. The output data OD0 is therefore not outputted from the output buffer 14.

Figure 18:
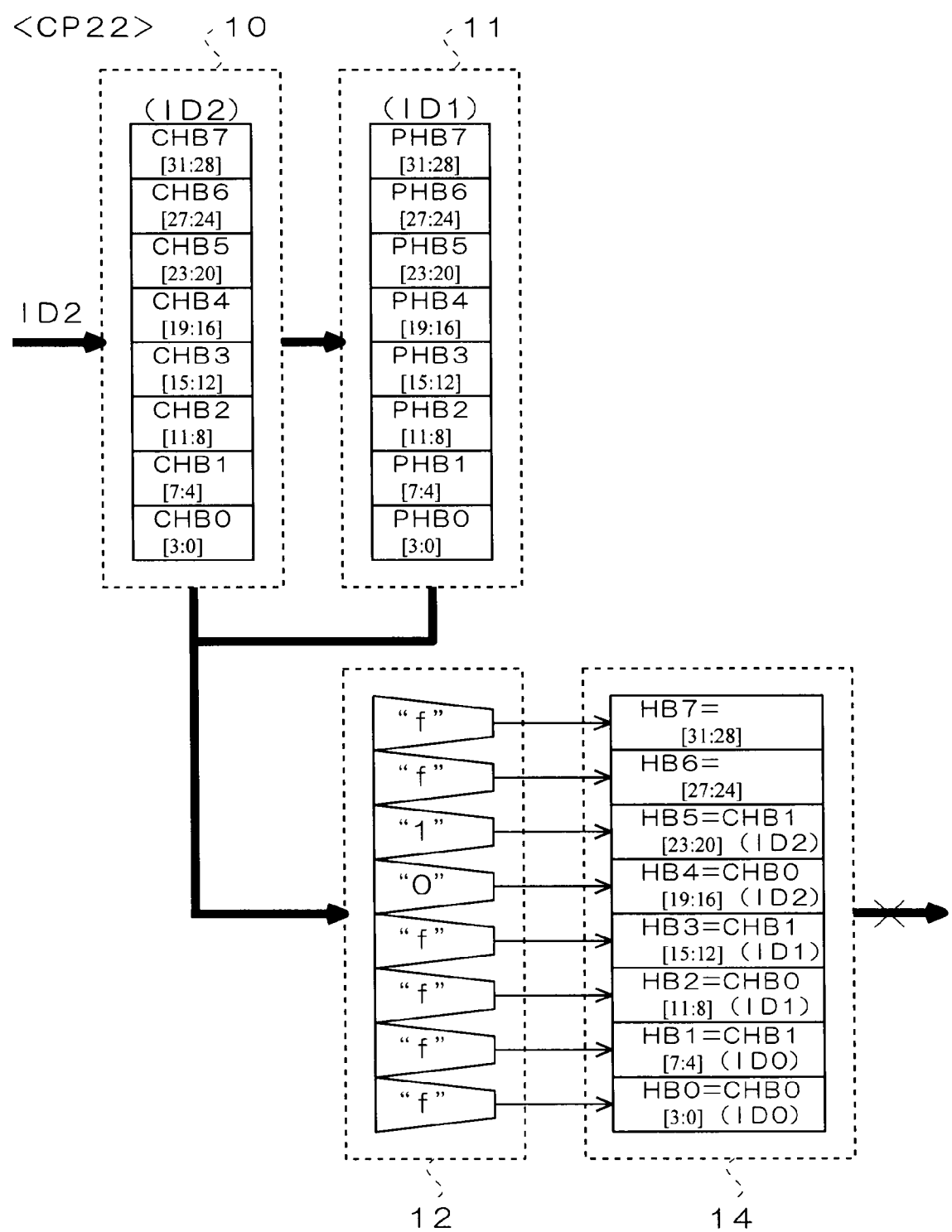
FIG. 18 is a block diagram illustrating how a format converter operates.

FIG. 18 is a block diagram illustrating how the format converter 3 operates when the sub pattern CP22 following the sub pattern CP21 is defined in the register 13. Since the item K3 is defined as "1", new input data ID2 is fetched into the first input buffer 10 and stored there.

Since the item K4 is defined as "2", the table TA2 in FIG. 9 is selected. Furthermore, the 0th to the 7th lanes in the item K5 are defined as "f", "f", "f", "f", "0", "1", "f", and "f", respectively. Thus sectional input data sets stored in the data storage areas CHB0 and CHB1 of the first input buffer 10 (i.e., the 0th byte of the input data ID2) are respectively copied into the data storage areas HB4 and HB5 of the output buffer 14. No sectional input data is copied into the data storage areas HB0 to HB3, HB6, and HB7 of the output buffer 14. At this time, sectional output data is not stored in the data storage areas HB6 and HB7. The output data OD0 is therefore not outputted from the output buffer 14.

Figure 19:
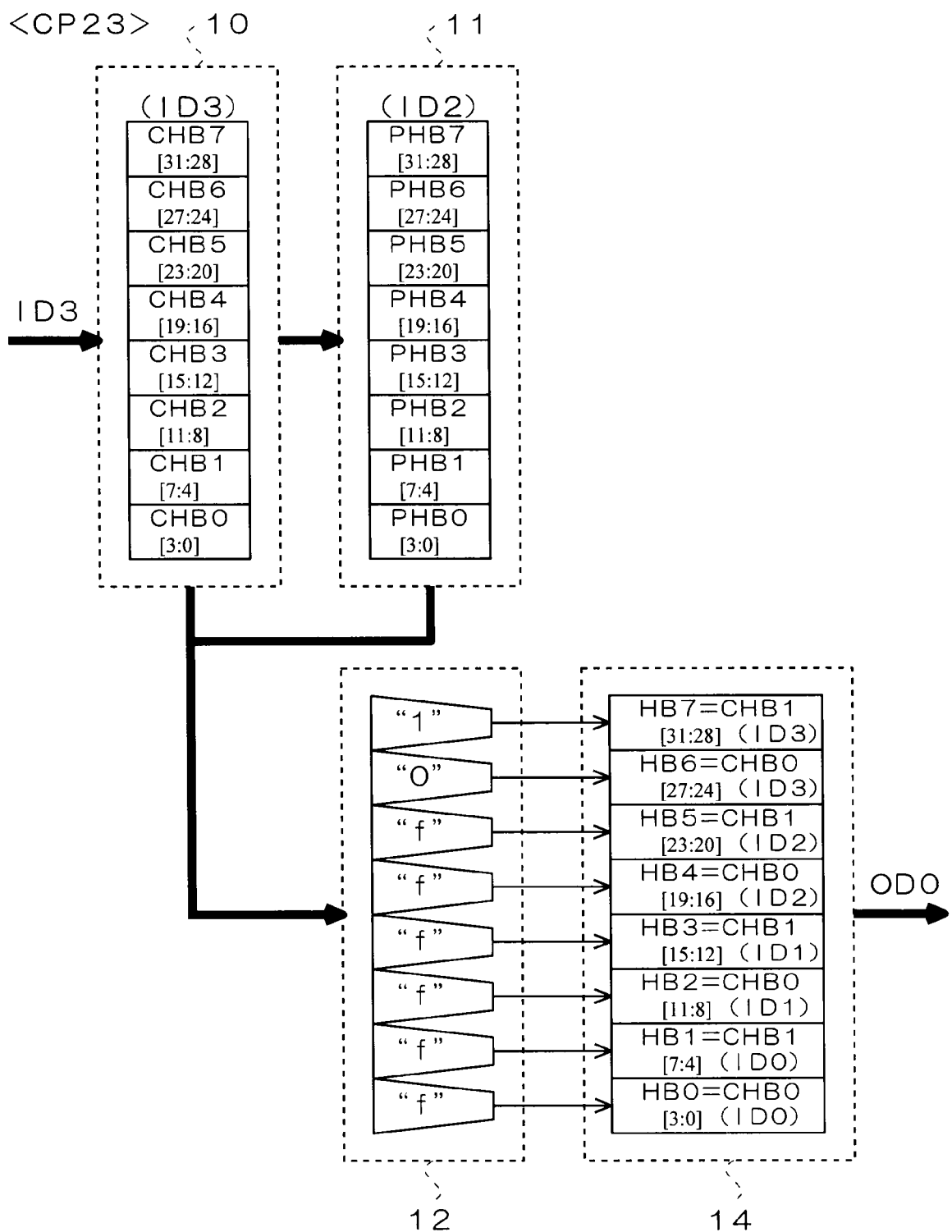
FIG. 19 is a block diagram illustrating how a format converter operates.

FIG. 19 is a block diagram illustrating how the format converter 3 operates when the sub pattern CP23 following the sub pattern CP22 is defined in the register 13. Since the item K3 is defined as "1", new input data ID3 is fetched into the first input buffer 10 and stored there.

Since the item K4 is defined as "2", the table TA2 in FIG. 9 is selected. Furthermore, the 0th to the 7th lanes in the item K5 are defined as "f", "f", "f", "f", "f", "f", "0", and "1", respectively. Thus sectional input data sets stored in the data storage areas CHB0 and CHB1 of the first input buffer 10 (i.e., the 0th byte of the input data ID3) are respectively copied into the data storage areas HB6 and HB7 of the output buffer 14. No sectional input data is copied into the data storage areas HB0 to HB5 of the output buffer 14. At this time, all of the data storage areas HB0 to HB7 are filled with the sectional output data. Eight sets of the sectional output data are therefore outputted from the output buffer 14 as one set of output data OD0.

Thus, according to the format converter 3 of the present embodiment, the output data OD is outputted from the output buffer 14 when all of the data storage areas HB0 to HB7 are filled with the sectional output data. When a transmission rate of the input data ID inputted to the format converter 3 is higher than that of the output data OD outputted from the format converter 3, output of data from the output buffer 14 can be suspended. This absorbs difference in the transmission rate, and thus achieves proper processing of a data format conversion.

The 0th, the 1st, the 2nd, and the 3rd bytes of the output data OD0 are identical to the 0th bytes of each of the input data sets ID0, ID1, ID2, and ID3, respectively. This means that the 0th bytes of each of the input data sets ID0, ID1, ID2, and ID3 sequentially inputted to the format converter 3 are extracted, and then outputted as the output data OD0.

<Expansion of Each Byte (Conversion Pattern CP3)>

FIG. 20 is a detailed diagram illustrating definitions of the conversion pattern CP3 shown in FIG. 4. The items K1 and K2 are defined as "3" and "0", respectively. Hence the conversion pattern CP3 consists of four sub patterns CP30, CP31, CP32, and CP33, starting with the sub pattern CP30. In FIG. 20, the items K1 and K2 of the sub patterns CP31 to CP33 are not illustrated.

The item K3 is defined as "1" in the sub pattern CP30, and defined as "0" in the sub patterns CP31 to CP33. Furthermore, in all of the sub patterns CP30 to CP33, the item K4 is defined as "0". In the sub pattern CP30, the 0th to the 7th lanes in the item K5 are defined as "0", "1", "0", "1", "0", "1", "0", and "1", respectively. In the sub pattern CP31, the 0th to the 7th lanes in the item K5 are defined as "2", "3", "2", "3", "2", "3", "2", and "3", respectively. In the sub pattern CP32, the 0th to the 7th lanes in the item K5 are defined as "4", "5", "4", "5", "4", "5", "4", and "5", respectively. In the sub pattern CP33, the 0th to the 7th lanes in the item K5 are defined as "6", "7", "6", "7", "6", "7", "6", and "7", respectively.

Figure 21:
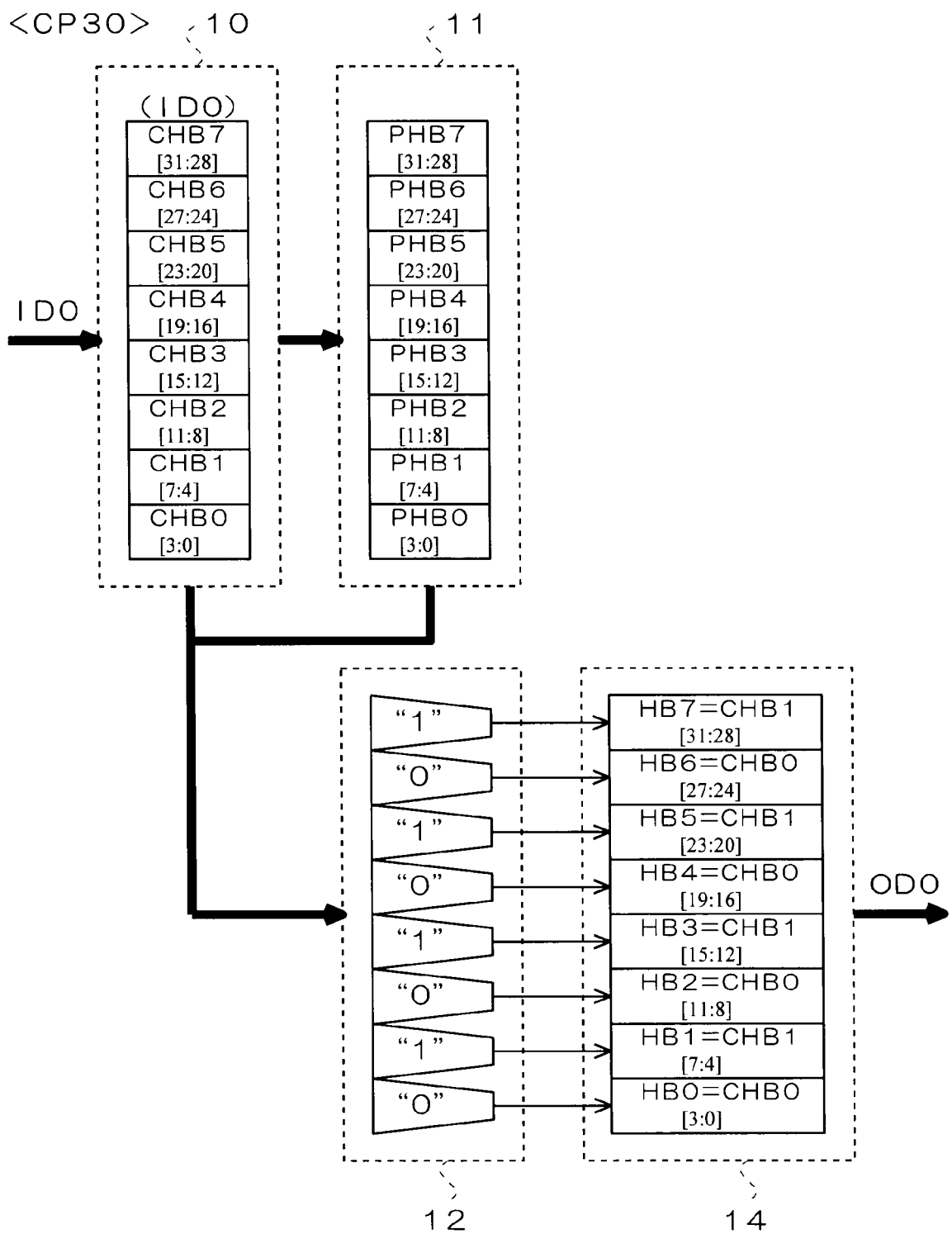
FIG. 21 is a block diagram illustrating how a format converter operates.

FIG. 21 is a block diagram illustrating how the format converter 3 operates when the sub pattern CP30 is defined in the register 13. Since the item K3 is defined as "1", new input data ID0 is fetched into the first input buffer 10 and stored there.

Since the item K4 is defined as "0", the table TA1 in FIG. 8 is selected. Furthermore, the 0th to 7th lanes in the item K5 are defined as "0", "1", "0", "1", "0", "1", "0", and "1", respectively. Thus sectional input data sets stored in the data storage areas CHB0, CHB1, CHB0, CHB1, CHB0, CHB1, CHB0, and CHB1 of the first input buffer 10 are respectively copied into the data storage areas HB0, HB1, HB2, HB3, HB4, HB5, HB6, and HB7 of the output buffer 14. Since all of the data storage areas HB0 to HB7 are filled with the sectional output data, eight sets of the sectional output data are outputted from the output buffer 14 as one set of output data OD0.

Figure 22:
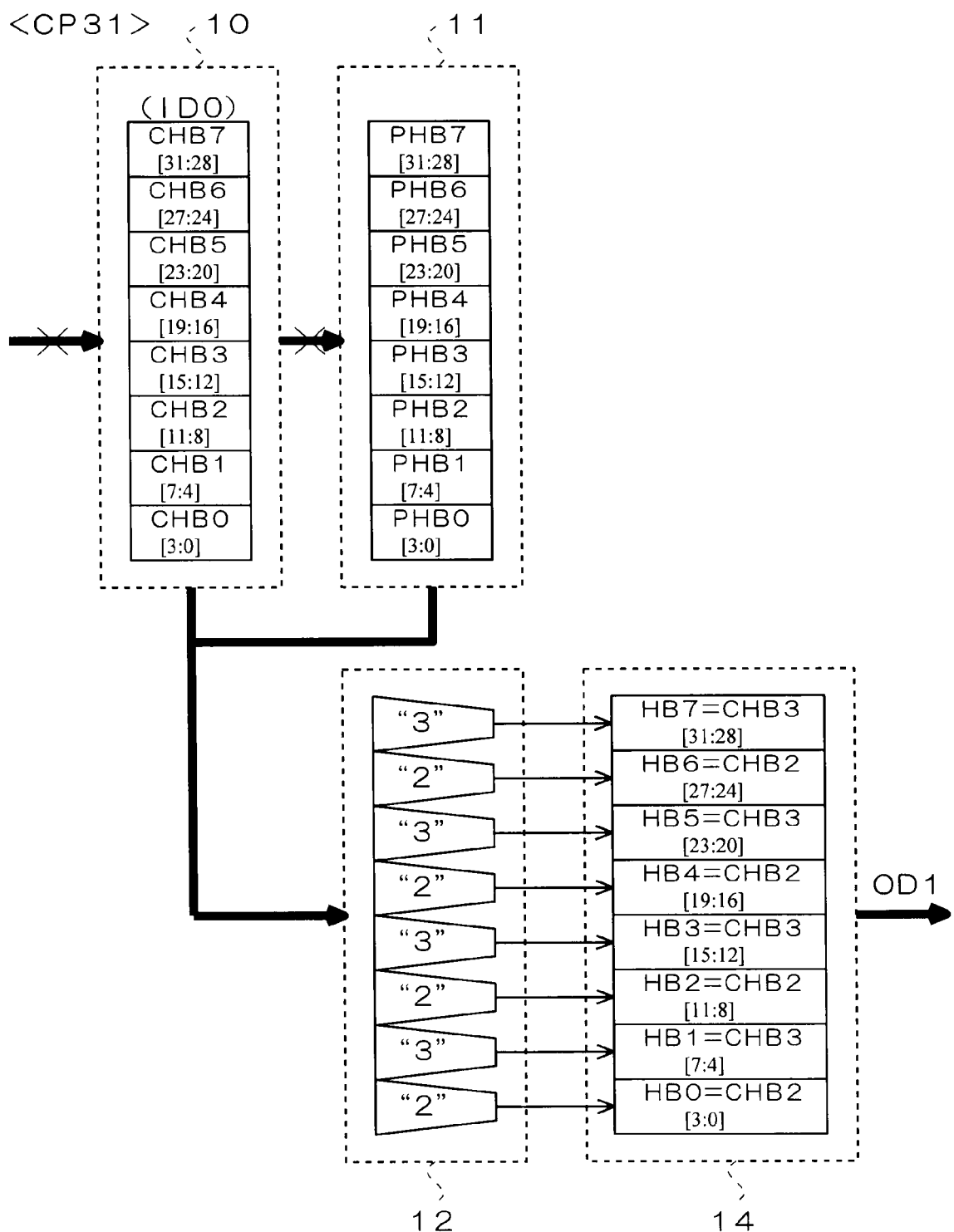
FIG. 22 is a block diagram illustrating how a format converter operates.

FIG. 22 is a block diagram illustrating how the format converter 3 operates when the sub pattern CP31 following the sub pattern CP30 is defined in the register 13. Since the item K3 is defined as "0", new input data is not fetched into the first input buffer 10, and the input data ID0 stored in the first input buffer 10 is maintained. In this case, in response to a write request to the format converter 3 issued by a preceding circuit, a notification that write data at that time is not accepted is sent from the format converter 3 to the preceding circuit.

Since the item K4 is defined as "0", the table TA1 in FIG. 8 is selected. Furthermore, the 0th to 7th lanes in the item K5 are defined as "2", "3", "2", "3", "2", "3", "2", and "3", respectively. Thus sectional input data sets stored in the data storage areas CHB2, CHB3, CHB2, CHB3, CHB2, CHB3, CHB2, and CHB3 of the first input buffer 10 are respectively copied into the data storage areas HB0, HB1, HB2, HB3, HB4, HB5, HB6, and HB7 of the output buffer 14. Since all of the data storage areas HB0 to HB7 are filled with the sectional output data, eight sets of the sectional output data are outputted from the output buffer 14 as one set of output data OD1.

Figure 23:
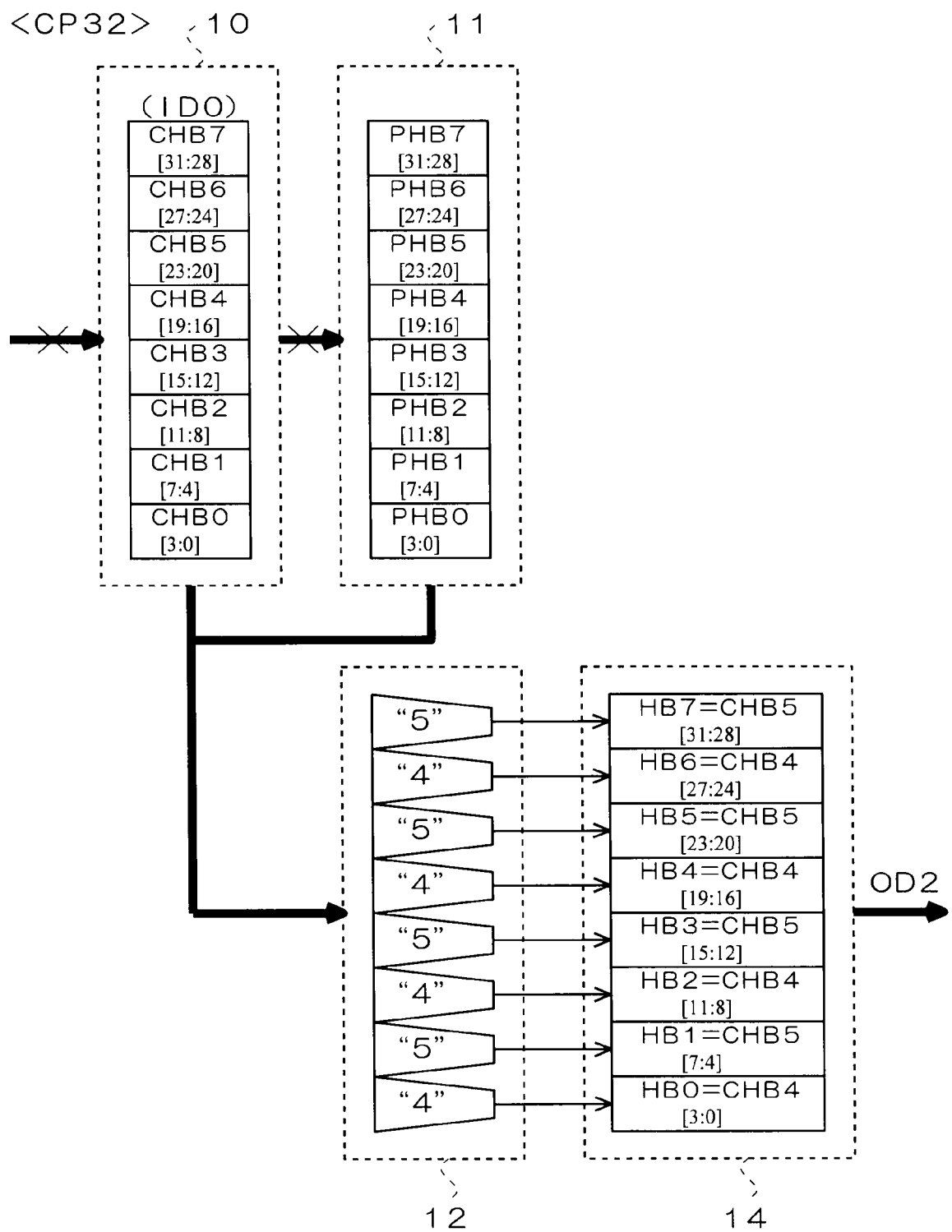
FIG. 23 is a block diagram illustrating how a format converter operates.

FIG. 23 is a block diagram illustrating how the format converter 3 operates when the sub pattern CP32 following the sub pattern CP31 is defined in the register 13. Since the item K3 is defined as "0", new input data is not fetched into the first input buffer 10, and the input data ID0 stored in the first input buffer 10 is maintained.

Since the item K4 is defined as "0", the table TA1 in FIG. 8 is selected. Furthermore, the 0th to 7th lanes in the item K5 are defined as "4", "5", "4", "5", "4", "5", "4", and "5", respectively. Thus sectional input data sets stored in the data storage areas CHB4, CHB5, CHB4, CHB5, CHB4, CHB5, CHB4, and CHB5 of the first input buffer 10 are respectively copied into the data storage areas HB0, HB1, HB2, HB3, HB4, HB5, HB6, and HB7 of the output buffer 14. Since all of the data storage areas HB0 to HB7 are filled with the sectional output data, eight sets of the sectional output data are outputted from the output buffer 14 as one set of output data OD2.

Figure 24:
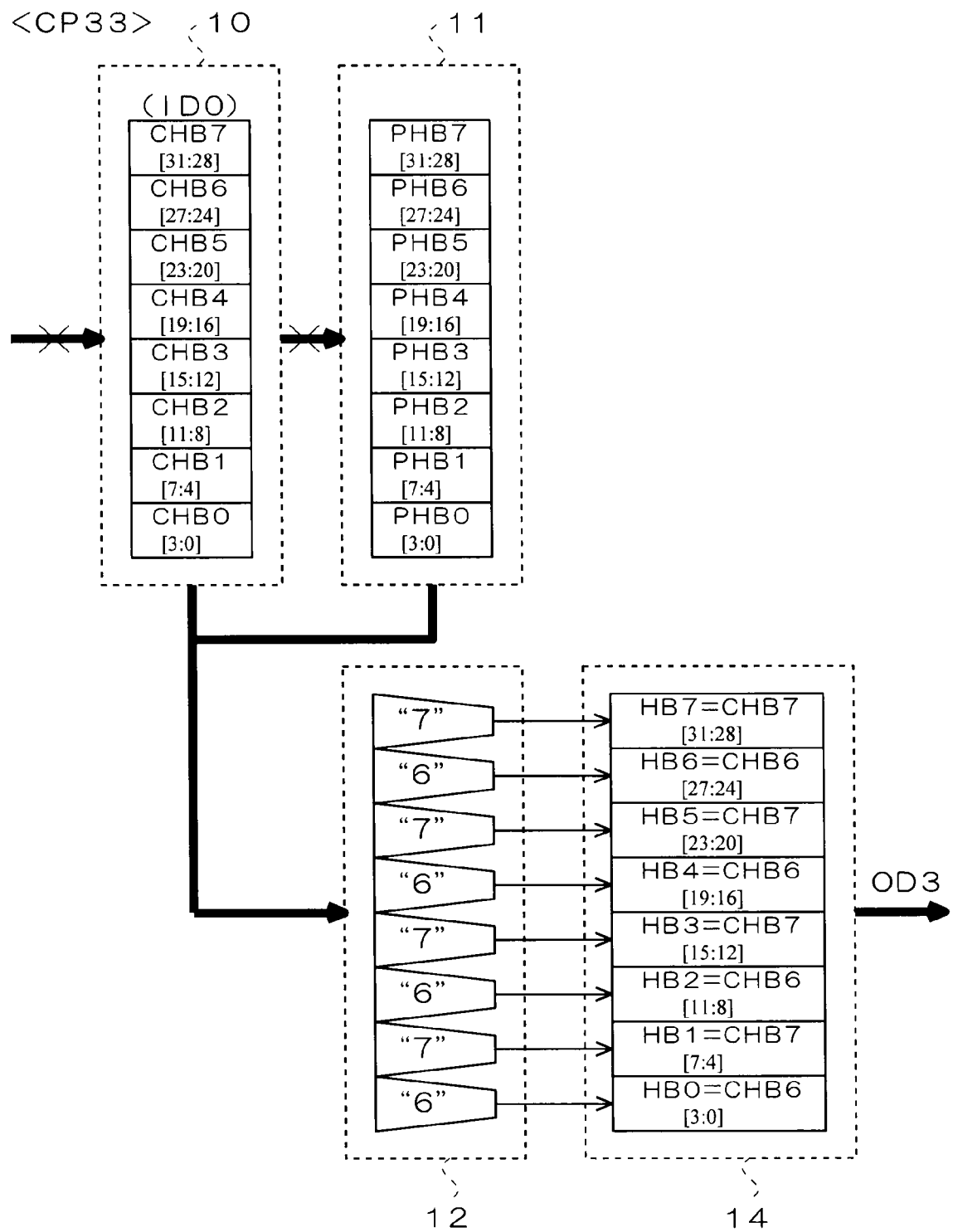
FIG. 24 is a block diagram illustrating how a format converter operates.

FIG. 24 is a block diagram illustrating how the format converter 3 operates when the sub pattern CP33 following the sub pattern CP32 is defined in the register 13. Since the item K3 is defined as "0", new input data is not fetched into the first input buffer 10, and the input data ID0 stored in the first input buffer 10 is maintained.

Since the item K4 is defined as "0", the table TA1 in FIG. 8 is selected. Furthermore, the 0th to 7th lanes in the item K5 are defined as "6", "7", "6", "7", "6", "7", "6", and "7", respectively. Thus sectional input data sets stored in the data storage areas CHB6, CHB7, CHB6, CHB7, CHB6, CHB7, CHB6, and CHB7 of the first input buffer 10 are respectively copied into the data storage areas HB0, HB1, HB2, HB3, HB4, HB5, HB6, and HB7 of the output buffer 14. Since all of the data storage areas HB0 to HB7 are filled with the sectional output data, eight sets of the sectional output data are outputted from the output buffer 14 as one set of output data OD3.

The output data sets OD0, OD1, OD2, and OD3 are identical to four times of each of the 0th, the 1st, the 2nd, and the 3rd bytes of the input data ID0, respectively. This means that each extracted byte of the input data ID0 inputted to the format converter 3 is expanded by four times, and then sequentially outputted as the output data OD0 to OD3.

<Packing 12 Bits to 16 Bits (Conversion Pattern CP4)>

FIG. 25 is a detailed diagram illustrating definitions of the conversion pattern CP4 shown in FIG. 4. The items K1 and K2 are defined as "3" and "0", respectively. Hence the conversion pattern CP4 consists of four sub patterns CP40, CP41, C42, and CP43, starting with the sub pattern CP40. In FIG. 25, the items K1 and K2 of the sub patterns CP41 to CP43 are not illustrated.

In all of the sub patterns CP40 to CP43, the item K3 is defined as "1". The item K4 is defined as "2" in the sub patterns CP40 and CP41, and defined as "0" in the sub patterns CP42 and CP43. In the sub pattern CP40, the 0th to the 7th lanes in the item K5 are defined as "0", "1", "2", "4", "5", "6", "f", and "f", respectively. In the sub pattern CP41, the 0th to the 7th lanes in the item K5 are defined as "f", "f", "f", "f", "f", "f", "0", and "1", respectively. In the sub pattern CP42, the 0th to the 7th lanes in the item K5 are defined as "a", "c", "d", "e", "0", "1", "2", and "4", respectively. In the sub pattern CP43, the 0th to the 7th lanes in the item K5 are defined as "d", "e", "0", "1", "2", "4", "5", and "6", respectively.

Figure 26:
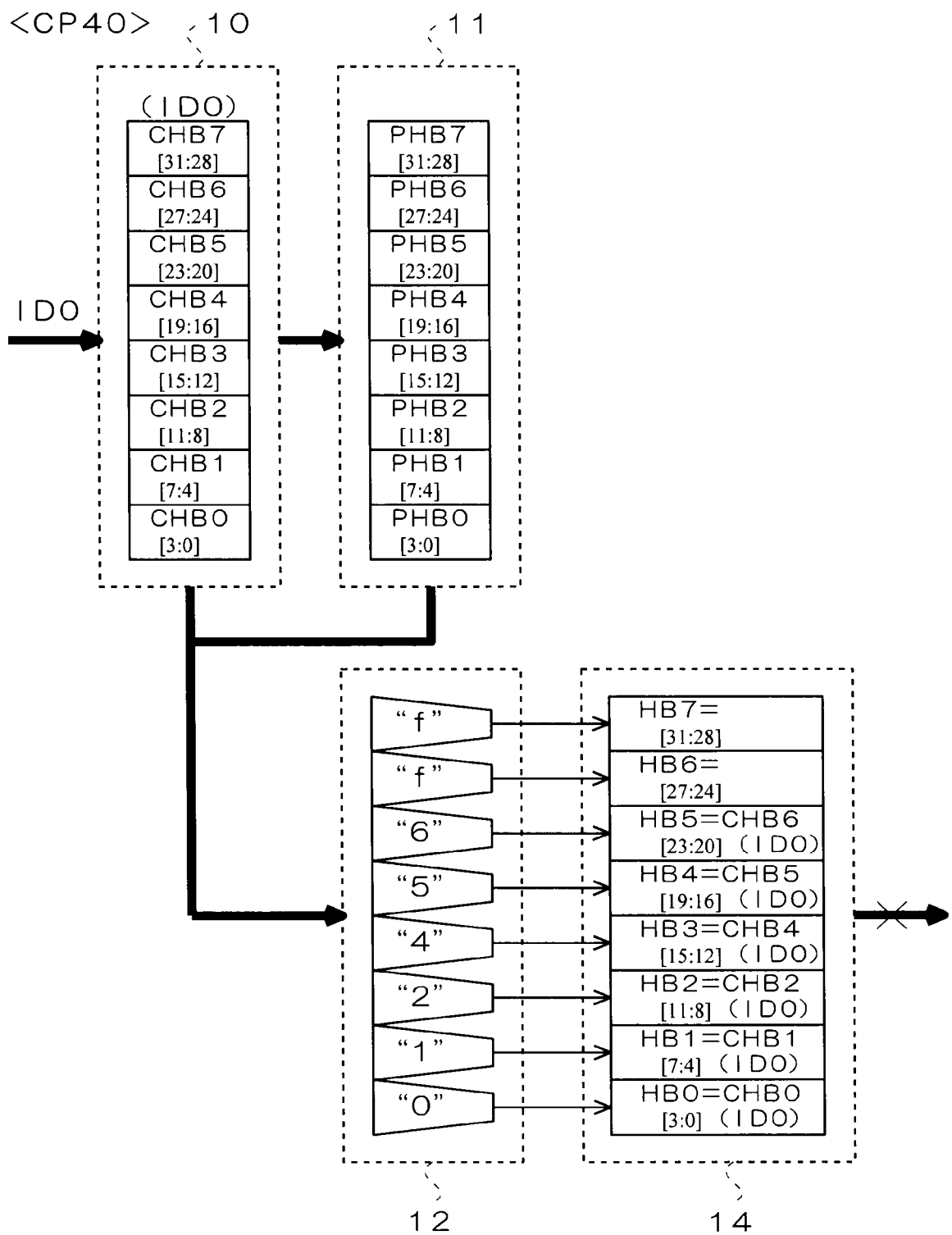
FIG. 26 is a block diagram illustrating how a format converter operates.

FIG. 26 is a block diagram illustrating how the format converter 3 operates when the sub pattern CP40 is defined in the register 13. Since the item K3 is defined as "1", new input data ID0 is fetched into the first input buffer 10 and stored there.

Since the item K4 is defined as "2", the table TA2 in FIG. 9 is selected. Furthermore, the 0th to the 7th lanes in the item K5 are defined as "0", "1", "2", "4", "5", "6", "f", and "f", respectively. Thus sectional input data sets stored in the data storage areas CHB0, CHB1, CHB2, CHB4, CHB5 and CHB6 of the first input buffer 10 (i.e., the 0th to the 11th and the 16th to the 27th bits of the input data ID0) are respectively copied into the data storage areas HB0, HB1, HB2, HB3, HB4 and HB5 of the output buffer 14. No sectional input data is copied into the data storage areas HB6 and HB7 of the output buffer 14. At this time, sectional output data is not stored in the data storage areas HB6 and HB7. The output data OD0 is therefore not outputted from the output buffer 14.

Figure 27:
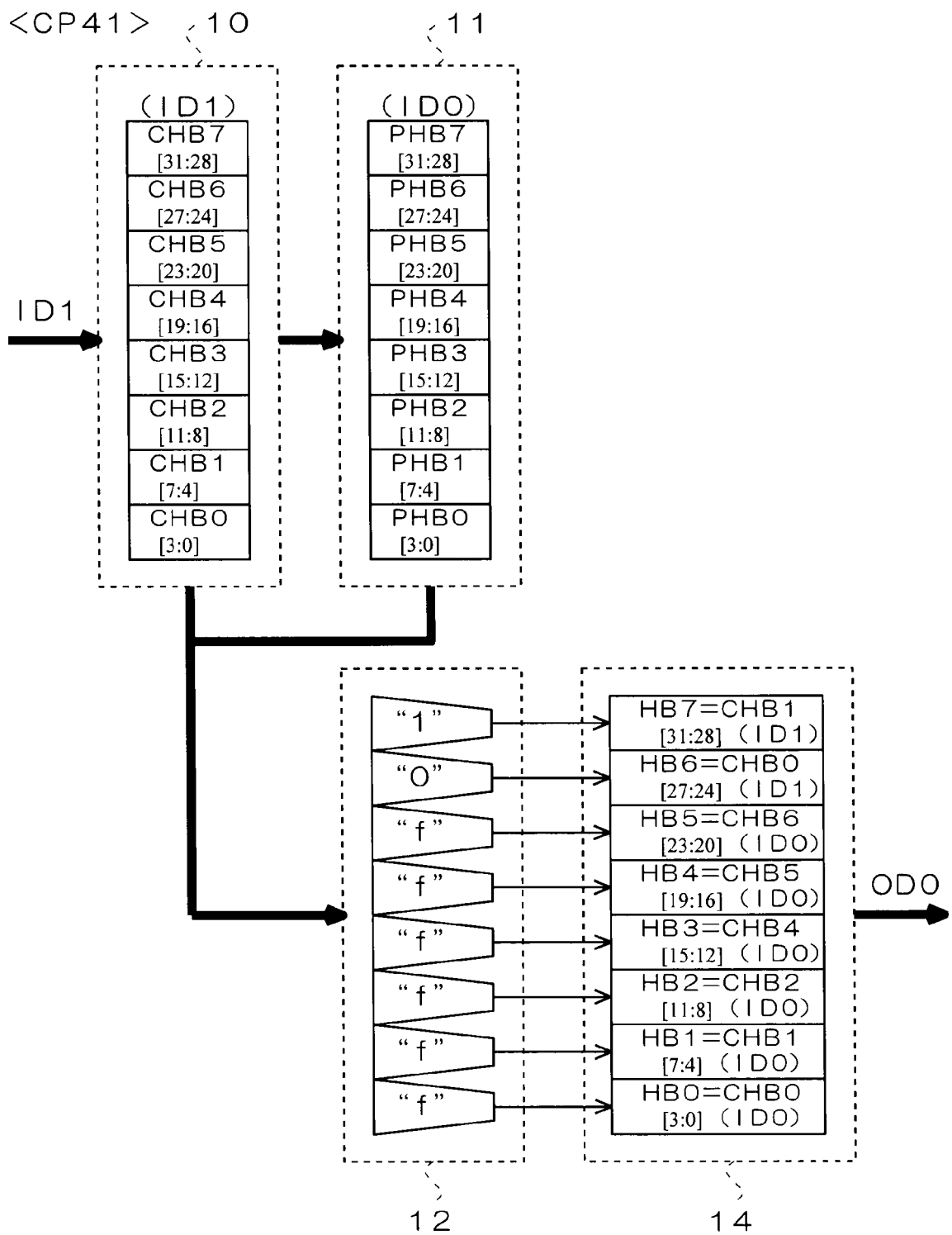
FIG. 27 is a block diagram illustrating how a format converter operates.

FIG. 27 is a block diagram illustrating how the format converter 3 operates when the sub pattern CP41 following the sub pattern CP40 is defined in the register 13. Since the item K3 is defined as "1", new input data ID1 is fetched into the first input buffer 10 and stored there.

Since the item K4 is defined as "2", the table TA2 in FIG. 9 is selected. Furthermore, the 0th to the 7th lanes in the item K5 are defined as "f", "f", "f", "f", "f", "f", "0", and "1", respectively. Thus no sectional input data is copied into the data storage areas HB0 to HB5 of the output buffer 14, and the 0th to the 11th and the 16th to the 27th bits of the input data ID0 remain. The sectional input data sets stored in the data storage areas CHB0 and CHB1 of the first input buffer 10 (i.e., the 0th to the 7th bits of the input data ID1) are respectively copied into the data storage areas HB6 and HB7 of the output buffer 14. At this time, all of the data storage areas HB0 to HB7 are filled with the sectional output data. Eight sets of the sectional output data are therefore outputted from the output buffer 14 as one set of output data OD0.

Figure 28:
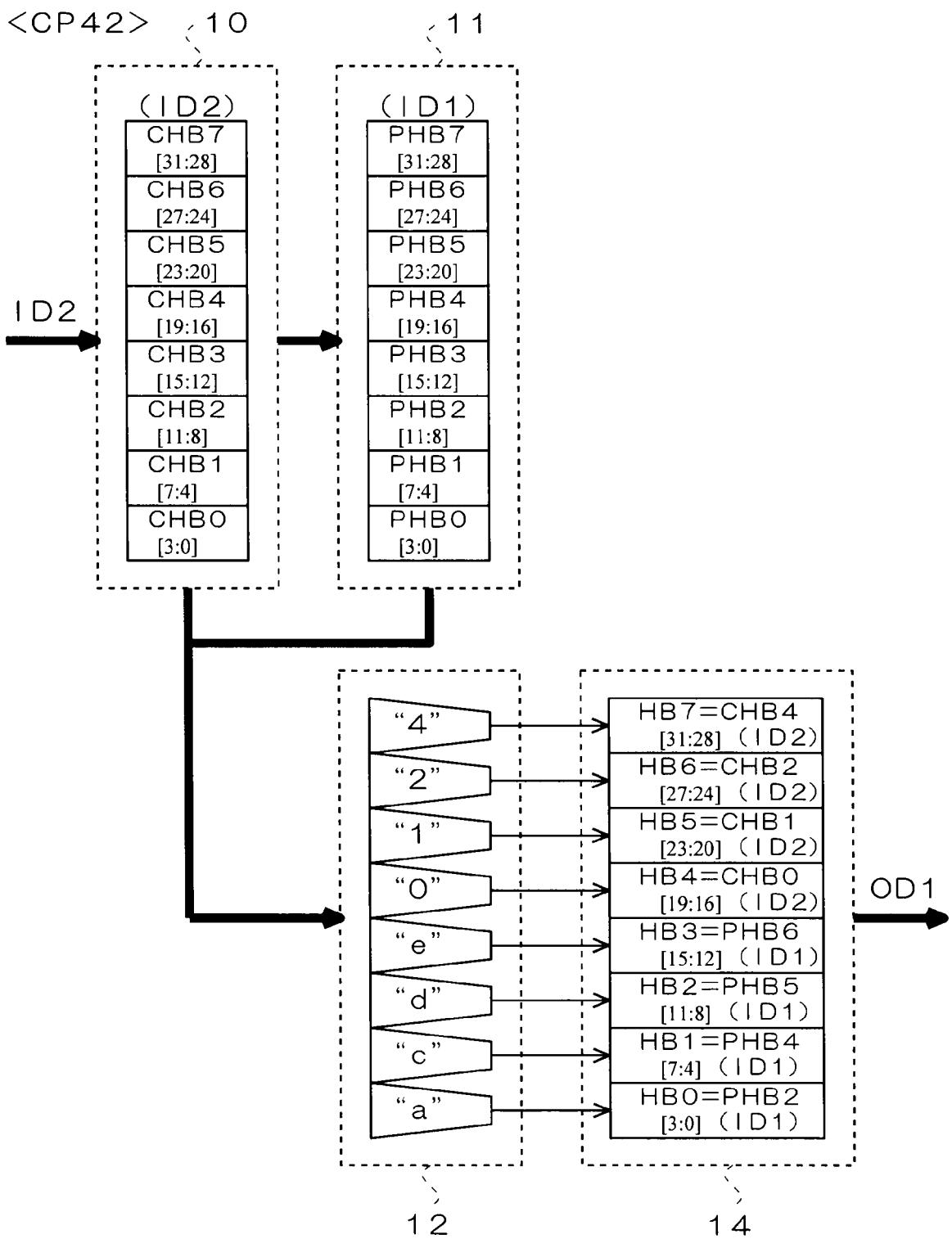
FIG. 28 is a block diagram illustrating how a format converter operates.

FIG. 28 is a block diagram illustrating how the format converter 3 operates when the sub pattern CP42 following the sub pattern CP41 is defined in the register 13. Since the item K3 is defined as "1", new input data ID2 is fetched into the first input buffer 10 and stored there. Furthermore, the input data ID1 is fetched from the first input buffer 10 into the second input buffer 11 and stored there.

Since the item K4 is defined as "0", the table TA1 in FIG. 8 is selected. Furthermore, the 0th to 7th lanes in the item K5 are defined as "a", "c", "d", "e", "0", "1", "2", and "4", respectively. Thus sectional input data sets stored in the data storage areas PHB2, PHB4, PHB5, PHB6, CHB0, CHB1, CHB2, and CHB4 (i.e., the 8th to the 11th and the 16th to the 27th bits of the input data ID1 and the 0th to the 11th and the 16th to the 19th bits of the input data ID2) are respectively copied into the data storage areas HB0, HB1, HB2, HB3, HB4, HB5, HB6, and HB7 of the output buffer 14. Since all of the data storage areas HB0 to HB7 are filled with the sectional output data, eight sets of the sectional output data are outputted from the output buffer 14 as one set of output data OD1.

Figure 29:
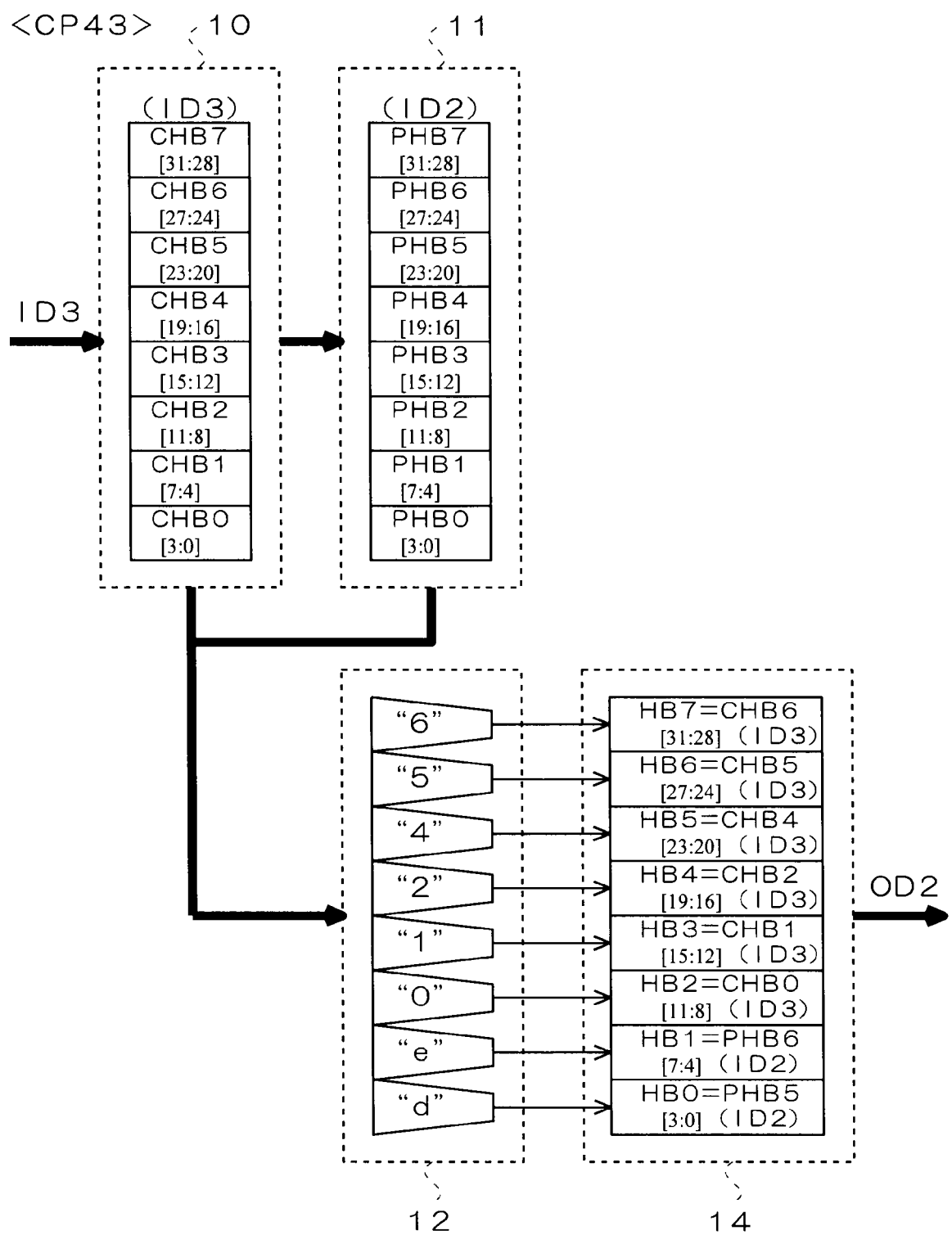
FIG. 29 is a block diagram illustrating how a format converter operates.

FIG. 29 is a block diagram illustrating how the format converter 3 operates when the sub pattern CP43 following the sub pattern CP42 is defined in the register 13. Since the item K3 is defined as "1", new input data ID3 is fetched into the first input buffer 10 and stored there. Furthermore, the input data ID2 is fetched from the first input buffer 10 into the second input buffer 11 and stored there.

Since the item K4 is defined as "0", the table TA1 in FIG. 8 is selected. Furthermore, the 0th to 7th lanes in the item K5 are defined as "d", "e", "0", "1", "2", "4", "5", and "6", respectively. Thus sectional input data sets stored in the data storage areas PHB5, PHB6, CHB0, CHB1, CHB2, CHB4, CHB5, and CHB6 (i.e., the 20th to the 27th bits of the input data ID2 and the 0th to the 11th and the 16th to the 27th bits of the input data ID3) are respectively copied into the data storage areas HB0, HB1, HB2, HB3, HB4, HB5, HB6, and HB7 of the output buffer 14. Since all of the data storage areas HB0 to HB7 are filled with the sectional output data, eight sets of the sectional output data are outputted from the output buffer 14 as one set of output data OD2.

The sectional input data corresponding to the 12th to the 15th and the 28th to the 31st bits of each of the input data sets ID0 to ID3 is excluded from the output data OD0 to OD2. This means that 16-bit data of the input data ID0 to ID3 inputted to the format converter 3 is reduced to 12-bit data and outputted as the output data OD0 to OD2.

<Unpacking 16 Bits to 12 Bits (Conversion Pattern CP5)>

FIG. 30 is a detailed diagram illustrating definitions of the conversion pattern CP5 shown in FIG. 4. The items K1 and K2 are defined as "3" and "0", respectively. Hence the conversion pattern CP5 consists of four sub patterns CP50, CP51, C52, and CP53, starting with the sub pattern CP50. In FIG. 30, the items K1 and K2 of the sub patterns CP51 to CP53 are not illustrated.

The item K3 is defined as "1" in the sub patterns CP50 to CP52, and defined as "0" in the sub pattern CP53. Furthermore, in all of the sub patterns CP50 to CP53, the item K4 is defined as "3". In the sub pattern CP50, the 0th to the 7th lanes in the item K5 are defined as "0", "1", "2", "e", "3", "4", "5", and "e", respectively. In the sub pattern CP51, the 0th to the 7th lanes in the item K5 are defined as "c", "d", "0", "e", "1", "2", "3", and "e", respectively. In the sub pattern CP52, the 0th to the 7th lanes in the item K5 are defined as "a", "b", "c", "e", "d", "0", "1", and "e", respectively. In the sub pattern CP53, the 0th to the 7th lanes in the item K5 are defined as "2", "3", "4", "e", "5", "6", "7", and "e", respectively.

Figure 31:
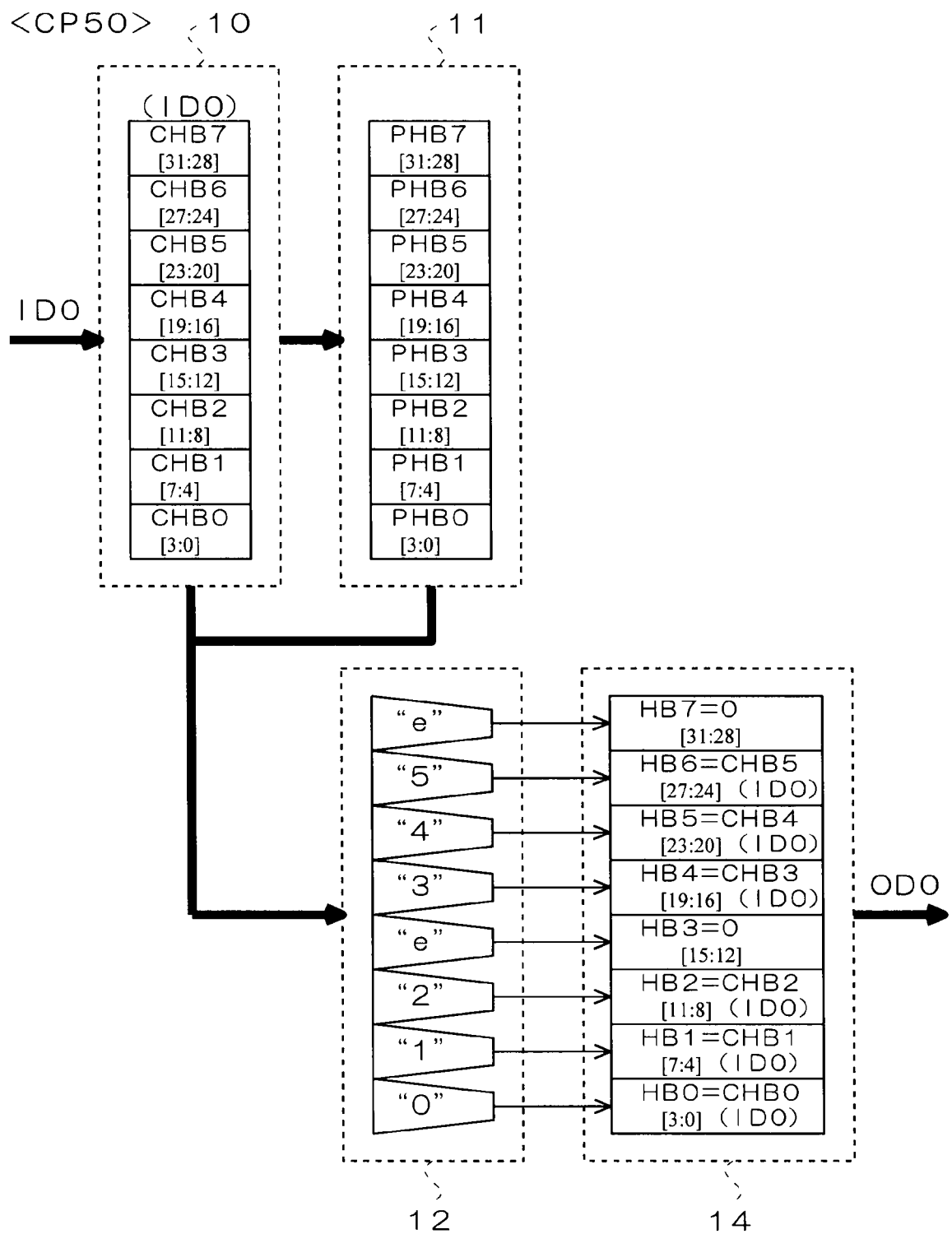
FIG. 31 is a block diagram illustrating how a format converter operates.

FIG. 31 is a block diagram illustrating how the format converter 3 operates when the sub pattern CP50 is defined in the register 13. Since the item K3 is defined as "1", new input data ID0 is fetched into the first input buffer 10 and stored there.

Since the item K4 is defined as "3", the table TA3 in FIG. 10 is selected. Furthermore, the 0th to 7th lanes in the item K5 are defined as "0", "1", "2", "e", "3", "4", "5", and "e", respectively. Thus sectional input data sets stored in the data storage areas CHB0, CHB1, CHB2, CHB3, CHB4, and CHB5 (i.e., the 0th to the 23rd bits of the input data ID0) are respectively copied into the data storage areas HB0, HB1, HB2, HB4, HB5, and HB6 of the output buffer 14. A fixed value (a desired fixed value of 4 bits, in this example) is stored in the data storage areas HB3 and HB7 of the output buffer 14. Since all of the data storage areas HB0 to HB7 are filled with the sectional output data, eight sets of the sectional output data are outputted from the output buffer 14 as one set of output data OD0.

Figure 32:
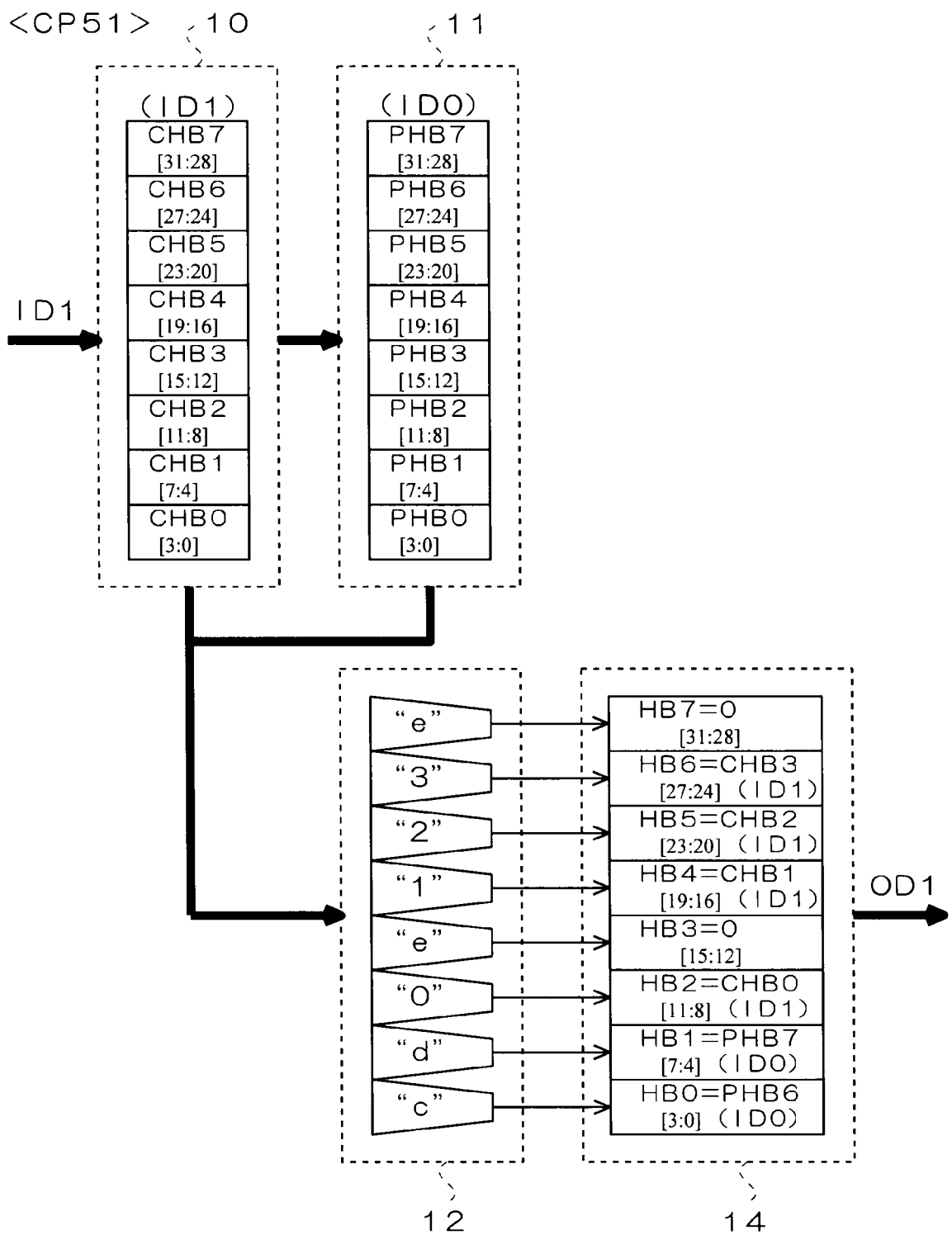
FIG. 32 is a block diagram illustrating how a format converter operates.

FIG. 32 is a block diagram illustrating how the format converter 3 operates when the sub pattern CP51 following the sub pattern CP50 is defined in the register 13. Since the item K3 is defined as "1", new input data ID1 is fetched into the first input buffer 10 and stored there. Furthermore, the input data ID0 is fetched from the first input buffer 10 into the second input buffer 11 and stored there.

Since the item K4 is defined as "3", the table TA3 in FIG. 10 is selected. Furthermore, the 0th to 7th lanes in the item K5 are defined as "c", "d", "0", "e", "1", "2", "3", and "e", respectively. Thus sectional input data sets stored in the data storage areas PHB6, PHB7, CHB0, CHB1, CHB2, and CHB3 (i.e., the 24th to the 31st bits of the input data ID0 and the 0th to the 15th bits of the input data ID1) are respectively copied into the data storage areas HB0, HB1, HB2, HB4, HB5, and HB6 of the output buffer 14. A fixed value (a desired fixed value of 4 bits, in this example) is stored in the data storage areas HB3 and HB7 of the output buffer 14. Since all of the data storage areas HB0 to HB7 are filled with the sectional output data, eight sets of the sectional output data are outputted from the output buffer 14 as one set of output data OD1.

Figure 33:
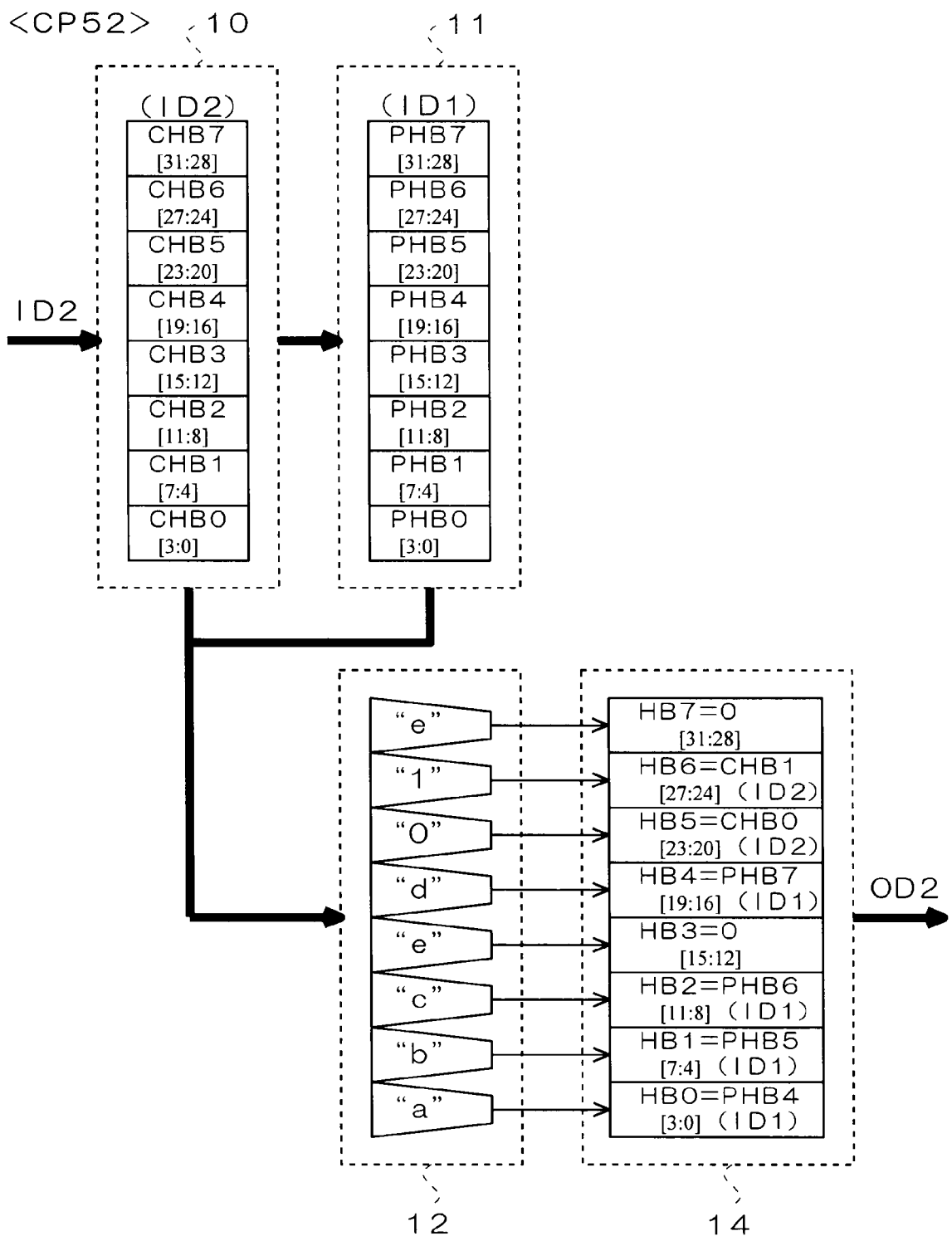
FIG. 33 is a block diagram illustrating how a format converter operates.

FIG. 33 is a block diagram illustrating how the format converter 3 operates when the sub pattern CP52 following the sub pattern CP51 is defined in the register 13. Since the item K3 is defined as "1", new input data ID2 is fetched into the first input buffer 10 and stored there. Furthermore, the input data ID1 is fetched from the first input buffer 10 into the second input buffer 11 and stored there.

Since the item K4 is defined as "3", the table TA3 in FIG. 10 is selected. Furthermore, the 0th to 7th lanes in the item K5 are defined as "a", "b", "c", "e", "d", "0", "1", and "e", respectively. Thus sectional input data sets stored in the data storage areas PHB4, PHB5, PHB6, PHB7, CHB0, and CHB1 (i.e., the 16th to the 31st bits of the input data ID1 and the 0th to the 7th bits of the input data ID2) are respectively copied into the data storage areas HB0, HB1, HB2, HB4, HB5, and HB6 of the output buffer 14. A fixed value (a desired fixed value of 4 bits, in this example) is stored in the data storage areas HB3 and HB7 of the output buffer 14. Since all of the data storage areas HB0 to HB7 are filled with the sectional output data, eight sets of the sectional output data are outputted from the output buffer 14 as one set of output data OD2.

Figure 34:
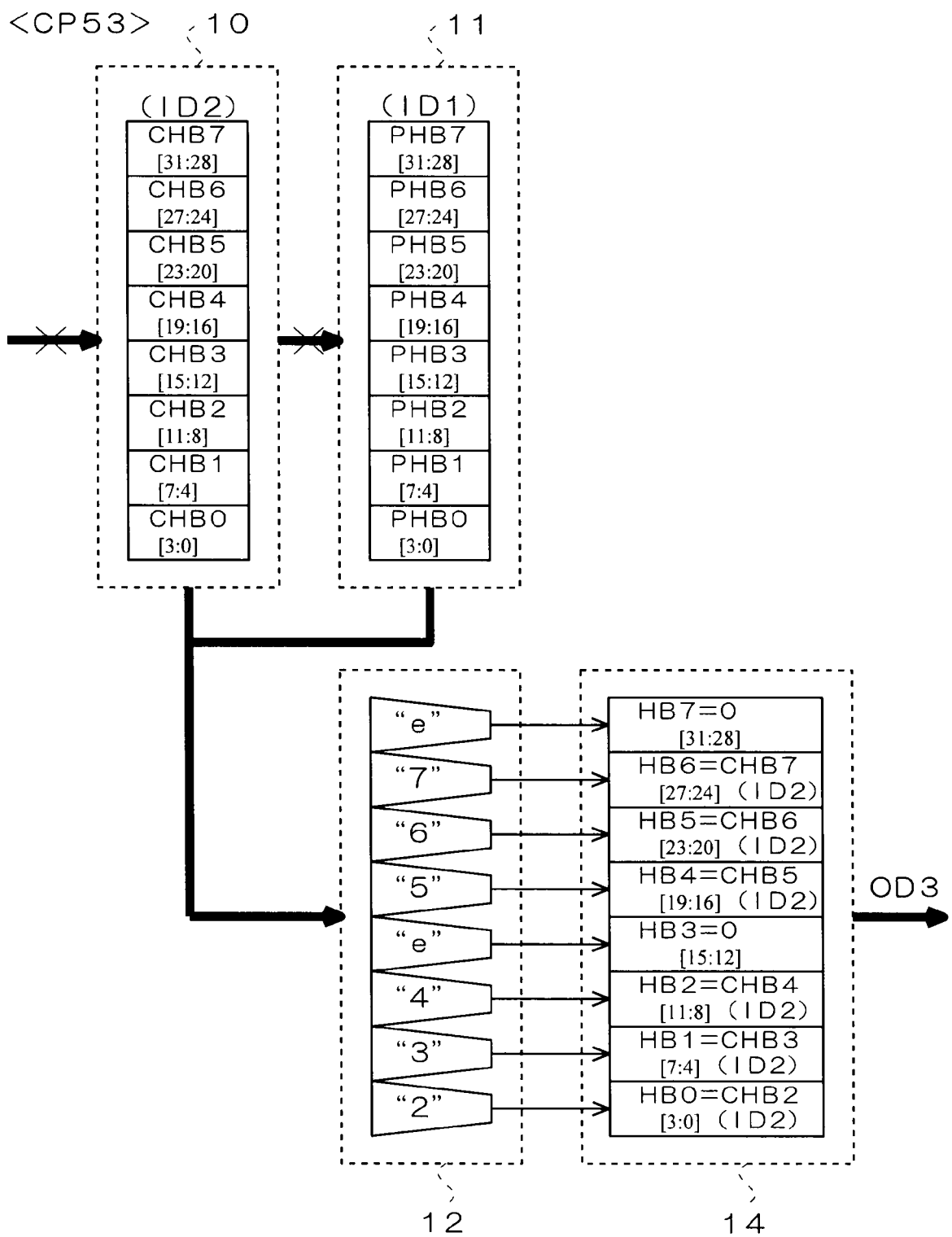
FIG. 34 is a block diagram illustrating how a format converter operates.

FIG. 34 is a block diagram illustrating how the format converter 3 operates when the sub pattern CP53 following the sub pattern CP52 is defined in the register 13. Since the item K3 is defined as "0", new input data is not fetched into the first input buffer 10, and the input data sets ID2 and ID1 respectively stored in the first input buffer 10 and the second input buffer 11 are maintained.

Since the item K4 is defined as "3", the table TA3 in FIG. 10 is selected. Furthermore, the 0th to 7th lanes in the item K5 are defined as "2", "3", "4", "e", "5", "6", "7", and "e", respectively. Thus sectional input data sets stored in the data storage areas CHB2, CHB3, CHB4, CHB5, CHB6, and CHB7 (i.e., the 8th to the 31st bits of the input data ID2) are respectively copied into the data storage areas HB0, HB1, HB2, HB4, HB5, and HB6 of the output buffer 14. A fixed value (a desired fixed value of 4 bits, in this example) is stored in the data storage areas HB3 and HB7 of the output buffer 14.

Since all of the data storage areas HB0 to HB7 are filled with the sectional output data, eight sets of the sectional output data are outputted from the output buffer 14 as one set of output data OD3.

The output data OD0 to OD3 are generated by dividing the whole input data ID0 to ID2 into eight groups of data, each group having 12 bits, and adding data of 4 bits (an arbitrary fixed value, in this example) to each group. This means that a data group of 12 bits from the input data ID0 to ID2 inputted to the format converter 3 is expanded to a data group of 16 bits, and then outputted as the output data OD0 to OD3.

While the invention has been described in detail, the foregoing description is in all aspects illustrative and not restrictive. It is understood that numerous other modifications and variations can be devised without departing from the scope of the invention.

What is claimed is:

1. A data processor, comprising:
a first input buffer configured to store first input data and including a plurality of data storage areas, each data storage area being configured to store a sectional input data set;
a second input buffer configured to store second input data that has been inputted prior to the first input data and including a plurality of data storage areas, each data storage area being configured to store a sectional input data set;
an output buffer including a plurality of storage areas and being configured to store output data;
a data converter connected between the first and second input buffers and the output buffer; and
a register storing plural conversion patterns in conformity with a desired data format conversion,
wherein the data converter is configured to generate the output data based on both the first input data that is currently stored in the first input buffer and the second input data that is currently stored in the second input buffer, in accordance with a selected one of the conversion patterns stored in the register, and to copy a sectional input data set from an arbitrary one of the plurality of data storage areas of the first and second input buffers to an arbitrary one of the data storage areas of the output buffer, based on the selected one of the conversion patterns.

2. The data processor according to claim 1, wherein
at least one of the plural conversion patterns is defined as a sequence of plural sub-patterns, and
the data converter is configured to generate the output data based on the first and second input data, in accordance with the sequence of plural sub-patterns stored in the register by carrying out plural conversions based on the plural sub-patterns in sequence using a result of a previous conversion as an input of a subsequent conversion.

3. The data processor according to claim 2, wherein the selected one of the conversion patterns defines whether or not to input subsequent input data to the first input buffer synchronously with an update of the selected one of the plural conversion patterns stored in the register to a subsequent conversion pattern.

4. The data processor according to claim 1, wherein the data processor is configured to output the output data from the output buffer when all of the plurality of data storage areas are filled with sectional output data.

5. The data processor according to claim 1, wherein when the data converter generates the output data based on the input data, the selected one of the conversion patterns defines that no section of input data currently stored in the first input buffer is copied for a desired section of the output data.

6. The data processor according to claim 5, wherein
each of the plural conversion patterns is created based on at least one of a plurality of tables in which a plurality of codes and source information indicating a section of input data to be copied to generate output data in relation to each code are described,
a specific code represents information indicating no section of the input data is copied, instead of the source information, and
source information to be omitted for assigning the specific code is different among the plurality of tables.

7. The data processor according to claim 1, wherein when the data converter generates the output data based on the input data, a conversion pattern of the plural conversion patterns defines that a fixed value is utilized for a desired section of the output data regardless of the input data.

8. The data processor according to claim 7, wherein
the conversion pattern is created based on at least one of a plurality of tables in which a plurality of codes and source information indicating a section of input data to be copied for generating output data in relation to each code are described,
a specific code represents information indicating a fixed value is utilized regardless of the input data, instead of source information, and
source information to be omitted for assigning the specific code is different among the plurality of tables.

9. The data processor according to claim 1, wherein the data convertor selects the arbitrary one of the plurality of data storage area of the first and second input buffers to copy to the arbitrary one of the plurality of data storage areas of the output buffer based on a value of the selected conversion pattern stored in the register.

* * * * *